April 5, 1966 R. F. SCHAUER 3,244,866

HIGH TO LOW ORDER ARITHMETIC CALCULATOR

Filed May 17, 1962 10 Sheets-Sheet 1

INVENTOR
RALPH F. SCHAUER

BY Elmer W. Galbiati

ATTORNEY

HIGH TO LOW ORDER ARITHMETIC CALCULATOR
Filed May 17, 1962 10 Sheets-Sheet 2
FIG. 2a
ADDITION
137534125
242461891
379996016
| STEP | REGISTER 10 | REGISTER 11 | COUNTER | REGISTER 13 | REGISTER 14 | OUTPUT REGISTER |
|---|---|---|---|---|---|---|
| 1 | 137534125 | 242461891 | 0 | 3 | | |
| 2 | 137534125 | 242461891 | 0 | | 7 | 3 |
| 3 | 137534125 | 242461891 | 1 | | 7 | 3 |
| 4 | 137534125 | 242461891 | 2 | | 7 | 3 |
| 5 | 137534125 | 242461891 | 3 | | 7 | 3 |
| 6 | 137534125 | 242461891 | 3 | 5 | | 37 |
| 6A | | | 2 | 5 | | 379 |
| 6B | | | 1 | 5 | | 3799 |
| 6C | | | 0 | 5 | | 37999 |
| 7 | 137534125 | 242461891 | 1 | 5 | | 37999 |
| 8 | 137534125 | 242461891 | 1 | | 1 | 379996 |
| 8A | | | 0 | | 1 | 3799960 |
| 9 | 137534125 | 242461891 | 0 | 6 | | 37999601 |
| 10 | END OF OPERATION | | 0 | | | 379996016 |
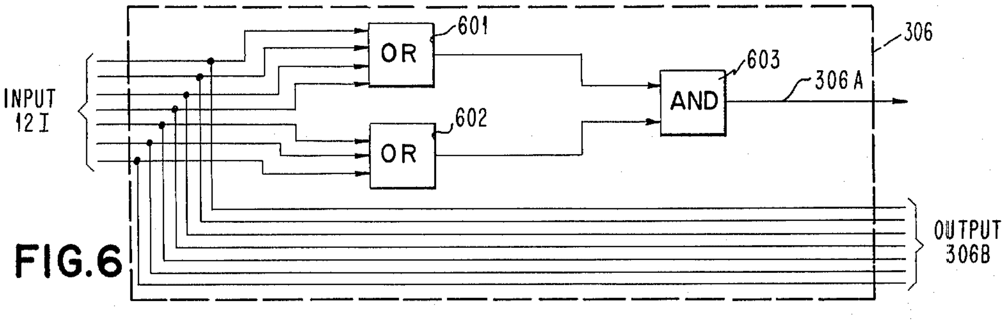
FIG. 6
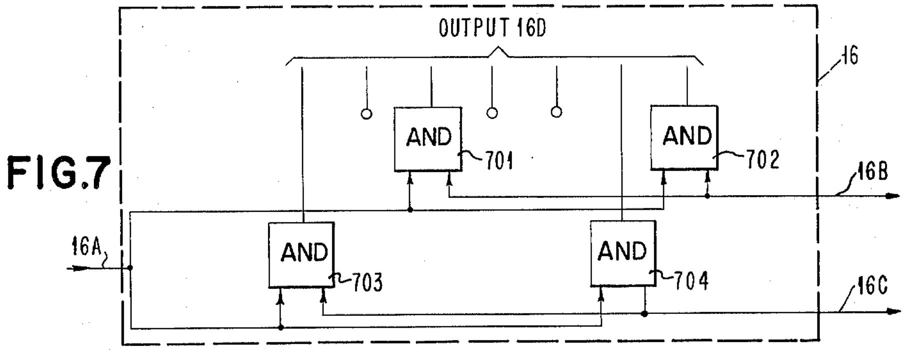
FIG. 7

SUBTRACTION 24508454
03238413
21270041

| STEP | REGISTER 10 | REGISTER 11 | COMPLEMENTED DIGIT | COUNTER | REGISTER 13 | REGISTER 14 | OUTPUT |
|---|---|---|---|---|---|---|---|
| 1 | 24508454 | 03238413 | 10 | | 2 | | |
| 2 | 24508454 | 03238413 | 7 | | | 1 | 2 |
| 3 | 24508454 | 03238413 | 8 | | 3 | | 21 |
| 4 | 24508454 | 03238413 | 7 | | | 7 | 212 |
| 5 | 24508454 | 03238413 | 2 | 1 | | 7 | 212 |
| 6 | 24508454 | 03238413 | 6 | 2 | | 7 | |
| 7 | 24508454 | 03238413 | 9 | 2 | 4 | | 2127 |
| 7A | | | | 1 | 4 | | 21270 |
| 7B | | | | 0 | 4 | | 212700 |
| 8 | 24508454 | 03238413 | 7 | | | 1 | 2127004 |
| 9 | END OF OPERATION | | | | | | 21270041 |

FIG. 2b

SUBTRACTION WITH FACTOR REVERSED

00043 − 00468 (NEGATIVE RESULT) CHANGED TO: 00468 − 00043 (POSITIVE RESULT)

| STEP | REGISTER 10 | REGISTER 11 | COMPLEMENTED DIGIT | COUNTER | REGISTER 13 | REGISTER 14 | OUTPUT |
|---|---|---|---|---|---|---|---|
| 1 | 00043 | 00468 | 10 | 1 | | | |
| 2 | 00043 | 00468 | 10 | 2 | | | |
| 3 | 00043 | 00468 | 6 | | | | |
| CHANGE IN WHICH REGISTER IS COMPLEMENTED | | | | | | | |
| 4 | 00043 | 00468 | 10 | | 4 | | |
| 4A | | | | 1 | 4 | | |
| 4B | | | | 0 | 4 | | 00 |
| 5 | 00043 | 00468 | 6 | | | 2 | 004 |
| 6 | 00043 | 00468 | 7 | | 5 | | 0042 |
| 7 | END OF OPERATION | | | | | | 00425 |

FIG. 2c

April 5, 1966 R. F. SCHAUER 3,244,866

HIGH TO LOW ORDER ARITHMETIC CALCULATOR

Filed May 17, 1962 10 Sheets-Sheet 4

April 5, 1966 R. F. SCHAUER 3,244,866

HIGH TO LOW ORDER ARITHMETIC CALCULATOR

Filed May 17, 1962 10 Sheets-Sheet 8

CARRY ADJUST CIRCUIT 17

April 5, 1966 R. F. SCHAUER 3,244,866

HIGH TO LOW ORDER ARITHMETIC CALCULATOR

Filed May 17, 1962 10 Sheets-Sheet 10

3,244,866

HIGH TO LOW ORDER ARITHMETIC CALCULATOR

Ralph F. Schauer, Hawthorne, N.Y., assignor to International Business Machines Corporation, New York, N.Y., a corporation of New York Filed May 17, 1962, Ser. No. 196,853
8 Claims. (Cl. 235—176)

The invention relates to digital computers and more particularly to serial arithmetic devices for performing logical operations such as addition and subtraction. This application is a continuation-in-part of application Serial No. 161,852 which was filed Dec. 26, 1961 (now abandoned).

The serial addition devices shown in the prior art generate sum digits beginning with the lower order positions and ending with the higher order positions. The reason for this is that the value of the sum digit in any particular position may depend upon carries from lower order positions. Likewise, the devices shown in the prior art for serially performing subtraction generate the result for the lower order positions before the result for the higher order positions due to the borrow operation.

Certain inputs to computing systems feed numbers into the system beginning with higher order positions. For example, with a typewriter connected to the input of a computer, numbers typed in the usual left to right manner go into the system serially with higher order digits going into the system before lower order digits. Because of the fact that the serial arithmetic devices known in the prior art operate upon low order digits before operating upon the high order digits, the serial computing systems known in the prior art require an extra amount of time and an extra amount of hardware in order to transfer numbers from a representation in which the high order digits occur first to a representation in which the low order digits occur first.

The present invention provides a serial arithmetic device which handles numbers beginning with the high order digits and ending with the low order digits. That is, the arithmetic device of the present invention can add and subtract numbers by serially examining the digits of the operands, beginning with the high order digit and ending with the low order digit.

An object of the present invention is to provide an improved arithmetic device.

A further object of the present invention is to provide an improved adding device.

Yet another object of the present invention is to provide an improved subtracting device.

Still another object of the present invention is to provide a serial adding device which operates upon the digits of the operands from high order positions to low order positions.

Yet another object of the present invention is to provide an adding device which receives the digits of the operands and which generates the digits of the sum beginning with the high order digits and ending with the low order digits.

Yet another object of the present invention is to provide a subtraction device which receives the digits of the operands and generates the digits of the result beginning with the high order digits and ending with the low order digits.

Still another object of the present invention is to provide a simple, inexpensive, arithmetic device which receives the digits of the operand and which generates the digits of the result beginning with the high order positions and ending with the low order positions.

The foregoing and other objects, features and advantages of the invention will be apparent from the following more particular description of preferred embodiments of the invention, as illustrated in the accompanying drawings.

In the drawings:

FIGURE 1 is an overall information flow diagram of the first embodiment of the invention.

FIGURE 2*a* is a chart which shows how an addition is performed by the device of the present invention.

FIGURE 2*b* is a chart which shows how a subtraction is performed by the device of the present invention.

FIGURE 2*c* is a chart which is used to explain how the device of the present invention detects which of two numbers is smaller.

FIGURE 3*a* and 3*b* (which fit together as shown in FIGURE 3) are a detailed logical circuit diagram of the first embodiment of the invention which is shown in FIGURE 1.

FIGURES 4*a*, 4*b* and 4*c* (which fit together as shown in FIGURE 4) are a circuit digram of the adder circuit.

FIGURE 6 is a circuit diagram of the detector.

FIGURE 7 is a circuit diagram of the digit generator.

Figure 1:
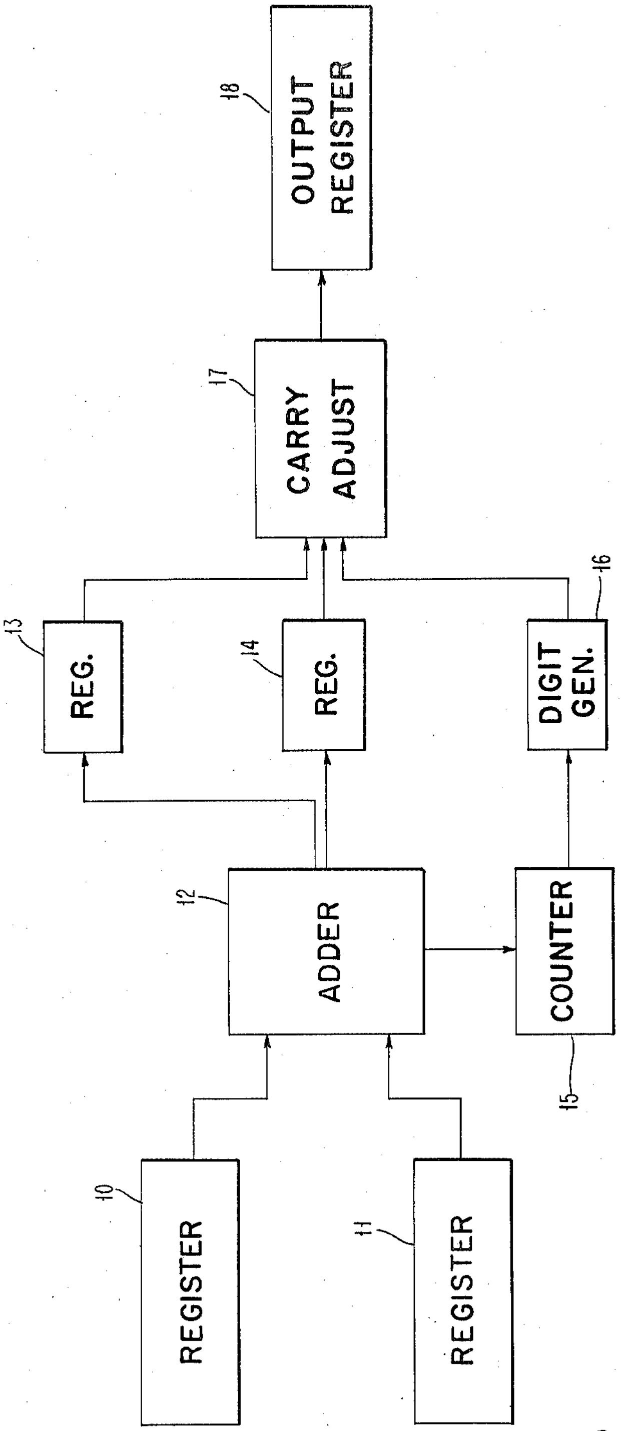
Figures 3, 3A:
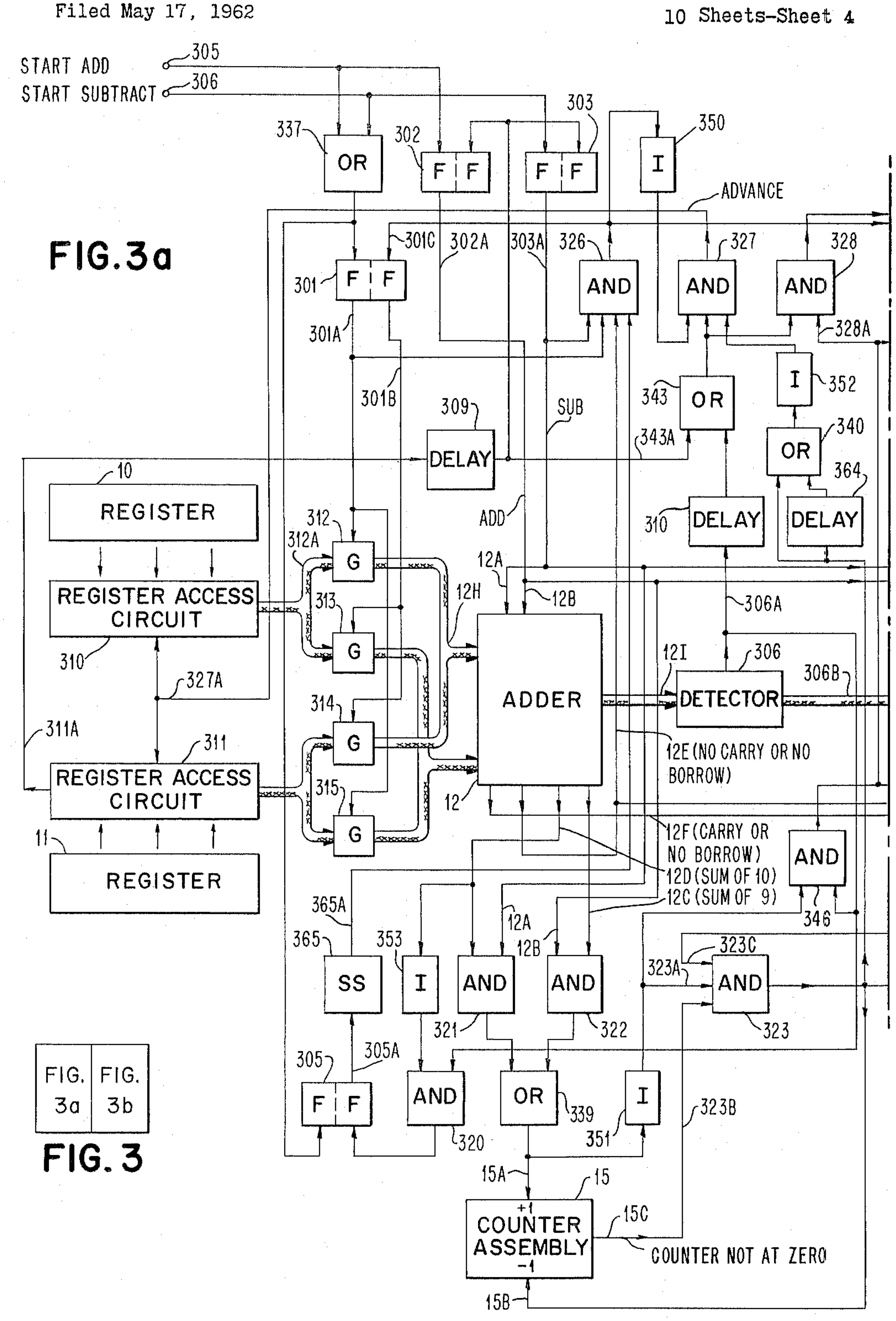
Figure 3B:
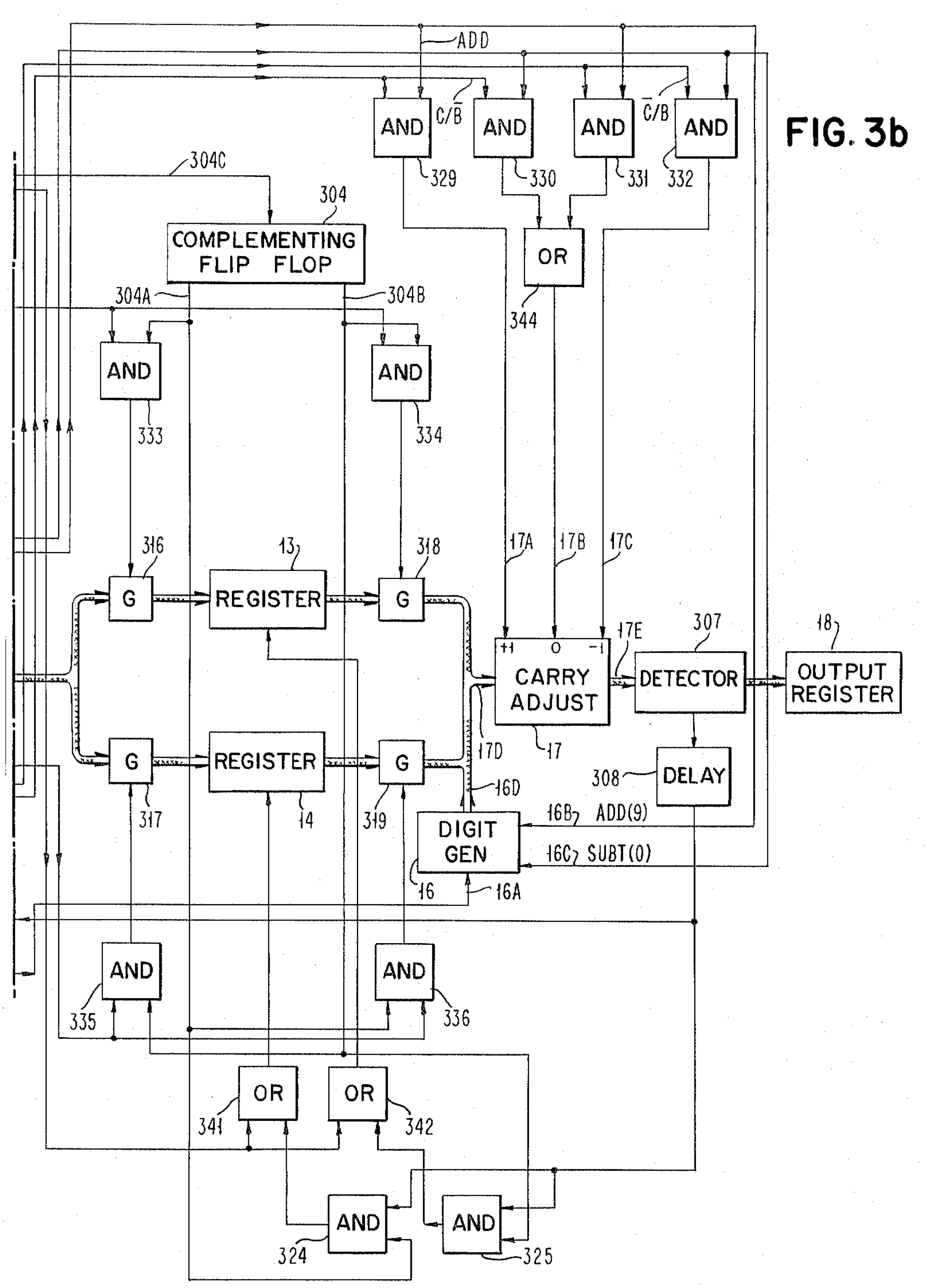

The preferred embodiments of the invention shown and described herein are devices for generating the sum or difference of two multidigit decimal numbers (i.e., numbers expressed in the base TEN). An overall flow diagram of the first preferred embodiment of the invention is shown in FIGURE 1. The diagram of FIGURE 1 shows the major components in the system but it does not show the gates and control circuitry which regulates the flow of information between the various components. The gates and control circuits are shown in FIGURES 3*a* and 3*b* and they will be explained later.

As shown in FIGURE 1 the system includes a first input register 10 and a second input register 11. A multidigit augend and a multidigit addend are respectively stored in registers 10 and 11 before the addition operation begins. The system as shown in FIGURE 1 also includes an adder circuit 12 which can add two single digit decimal numbers, two temporary storage registers 13 and 14 each of which can store one decimal digit, a counter 15, a digit generator 16, carry adjust circuitry 17 and a multidigit output register 18.

*Addition is performed as follows.*—The digits of the augend are placed in register 10 and the corresponding digits of the addend are placed in register 11. After the addition is completed, the digits of the sum appear in output register 18. During the addition operation corresponding digits of the augend and of the addend are serially supplied from registers 10 and 11 to adder 12 beginning with the highest order digit and ending with the lowest order digit.

Adder 12 generates the sum of the two digits which it receives from registers 10 and 11. Since each digit supplied by registers 10 and 11 is a decimal digit which may range from ZERO to NINE, the sum may range from ZERO to EIGHTEEN. The low order digit of each sum generated by adder 12 (except when the sum is a NINE) is stored in either register 13 or in register 14, sequentially generated digits being alternately stored in register 13 and in register 14. When a sum digit is stored in one of the registers 13 or 14, the digit stored in the other register 13 or 14 is gated through carry adjust circuitry 17 to output register 18. When adder circuit 12 generates a sum digit of NINE, no information is placed in either register 13 or in register 14 and counter 15 is incremented by ONE.

There are four possible sequences of operations which may occur during an addition operation when a digit is stored in one of the registers 13 or 14. The possible sequences of operations are outlined below.

(1) When the adder circuit 12 generates a sum digit less than NINE at a time when the count in counter 15 is ZERO the sum digit is stored in the appropriate register 13 or 14 (n.b., the digits are alternately stored in register 13 and in register 14) and the digit which is stored in the other register 13 or 14 is gated unchanged through carry adjust circuitry 17 to output register 18.

(2) When the adder circuit 12 generates a sum digit greater than NINE at a time when the count in counter 15 is ZERO, the lower order digit of the sum generated by adder 12 is stored in the appropriate register 13 or 14 (n.b., the digits are alternately stored in register 13 and in register 14) and the digit which is stored in the other register 13 or 14 is gated through carry adjust circuit 17 where it is incremented by ONE and the incremented digit is gated to output register 18.

(3) When the adder circuit 12 generates a sum digit less than NINE at a time when counter 15 has a value other than ZERO stored therein, the sum digit is stored in the appropriate register 13 or 14 and the contents of the other register 13 or 14 is gated unchanged through carry adjust circuit 17 to output register 18. Thereafter a number of NINES equal to the count in the counter 15 is sequentially generated by the circuit 16 and each NINE which is generated is gated unchanged through carry adjust circuit 17 to output register 18.

(4) When the adder circuit 12 generates a sum digit greater than NINE at a time when counter 15 has a value other than ZERO stored therein the lowest order digit of the sum is stored in the appropriate register 13 or 14 and the contents of the other register 13 or 14 is gated through carry adjust circuitry 17 where it is incremented by ONE and the incremented digit is gated to output register 18. Thereafter a number of NINES equal to the count in the counter 15 is generated by circuit 16, and these NINES are gated through carry adjust circuitry 17 where ONE is added to each NINE making each NINE into a ZERO and the ZEROES are gated to output register 18.

It should be particularly noted that when a sum greater than NINE is generated by adder circuit 12 only the lower order digit of the sum is stored in register 13 or in register 14. The higher order digit of the sum is used as a control signal to operate the control circuitry as the following description will show.

The general manner in which an addition operation is performed is best understood with reference to the chart of FIGURE 2*a* which shows how the augend 137534125 can be added to the addend 242461891 to produce the sum 379996016. As shown in the chart of FIGURE 2*a* the particular addition which is shown is performed in ten major steps. The particular digit of the augend and the particular digit of the addend which are gated to adder 12 during each step of the addition are shown by a bold letter and underlined in the chart. The operations which occur during each step are explained below.

First step of the addition: (a) The first digit of the augend and the first digit of the addend are gated from registers 10 and 11 to adder 12, (b) adder 12 generates the sum digit THREE, and (c) the sum digit THREE is placed in register 13.

Second step of the addition: (a) The second digit of the augend and the second digit of the addend are gated from registers 10 and 11 to adder 12, (b) adder 12 generates the sum digit SEVEN and (c) the digit THREE is transferred from register 13 to output register 18 (d) the sum digit SEVEN is placed in register 14.

Third step of the addition: (a) The third digit of the augend and the third digit of the addend are gated from registers 10 and 11 to adder circuit 12, (b) adder circuit 12 generates the sum digit NINE, and (c) since the sum digit is a NINE, the sum digit is not placed in register 13 or in register 14 but instead counter 15 is incremented by ONE.

Fourth step of the addition: (a) The fourth digit of the augend and the fourth digit of the addend are gated from registers 10 and 11 to adder circuit 12, (b) adder circuit 12 generates the sum digit NINE, and (c) since the sum digit is a NINE the sum digit is not placed in register 13 or in register 14 but instead counter 15 is incremented by ONE.

Fifth step of the addition: (a) The fifth digit of the augend and the fifth digit of the addend are gated from registers 10 and 11 to adder circuit 12, (b) adder circuit 12 generates the sum digit NINE, and (c) since the sum digit is a NINE the sum digit is not placed in register 13 or in register 14 and counter 15 is again incremented by ONE.

Sixth step of the addition: (a) The sixth digit of the augend and the sixth digit of the addend are gated from registers 10 and 11 to adder circuit 12, (b) adder circuit 12 generates the sum digit FIVE, and (c) since the sum digit FIVE is less than NINE and since the counter 15 has a value other than ZERO stored therein, the content of register 14 is gated unchanged through carry adjust circuit 17 to output circuit 18, the sum digit FIVE is stored in register 13, and (steps 6A, 6B and 6C) digit generator 16 generates three NINES which are gated unchanged through carry adjust circuitry 17 to output register 18.

Seventh step of the addition: (a) The seventh digit of the augend and the seventh digit of the addend are gated from registers 10 and 11 to adding circuit 12, (b) adding circuit 12 generates the sum digit NINE and (c) since the sum digit is a NINE the sum digit is not placed in register 13 or in register 14 but instead counter 15 is incremented by ONE.

Eighth step of the addition: (a) The eighth digit of the augend and the eighth digit of the addend are gated from registers 10 and 11 to adding circuit 12, (b) adding circuit 12 generates the sum ELEVEN, i.e., by generating a sum digit of ONE and an indication that there is a carry, and (c) since the sum is greater than NINE and since the counter 15 has a value other than ZERO stored therein, the low order digit of the sum, ONE, is stored in register 14, the content of register 13 is gated through carry adjust circuit 17 where it is incremented by ONE, the incremented digit is gated to output circuitry 18, and (step 8A) digit generator 16 generates one NINE which is gated through carry adjust circuitry 17 where it is incremented by ONE changing the NINE to a ZERO and the ZERO is stored in output register 18.

Ninth step of the addition: (a) The ninth digit of the augend and the ninth digit of the addend are gated from registers 10 and 11 to adding circuit 12, (b) adding circuit 12 generates the sum digit SIX, and (c) since the sum digit is less than NINE the sum digit SIX is stored in register 13 and the content of register 14 is gated unchanged through carry adjust circuitry 17 to the output 18.

Tenth step of the addition: (a) Registers 10 and 11 indicate that they are empty thereby indicating that the addition is complete, the last sum digit generated by adder circuit 12 which is stored in register 13 is gated unchanged through carry adjust circuit 17 to output 18.

*Subtraction is performed as follows.*—The digits of a first number are placed in register 10 and the digits of a second number are placed in register 11. The digits in registers 10 and 11 are then sequentially supplied to adder circuit 12, higher order digits first as during addition. After the subtraction is completed the digits of the number which represents the difference between the two numbers which were placed in registers 10 and 11 appears in output register 18. It is not necessary to know which of the two numbers placed in registers 10 and 11 is largest before the subtraction operation is performed. The system of the present invention determines which of the numbers is the largest and then it subtracts the smaller number from the larger number.

In the first preferred embodiment of the invention, adder 12 performs subtraction by first generating the TENS complement of the digit which it receives from the register which contains the smaller number and by then adding the complemented digit to the digit which it receives from the other register. For purposes of the present discussion it will be assumed that the larger number was placed in register 10 and that the smaller number was placed in register 11 and therefore that the adder 12 generates the TENS complement of the digit it receives from register 11. The manner in which the system actually determines which registers actually contain the smaller number, and hence the manner in which the system determines which digits should be complemented will be explained in detail later.

Since each digit supplied by registers 10 and 11 is a decimal digit which may vary from ZERO to NINE, and hence since the TENS complement of a decimal digit may range from ZERO to TEN, the sum generated by adder 12 may range from ZERO to NINETEEN. The lower order digits of the sums generated by adder 12 (except when the sum is TEN) are stored in registers 13 and 14 as during an addition operation. When a digit is stored in one of the registers 13 or 14, the digit stored in the other register 13 or 14 is gated through carry adjust circuit 17 to output register 18. When adder circuit 12 generates a sum digit of TEN, no information is placed in either register 13 or register 14 and counter 15 is incremented by ONE.

There are four possible sequences of operations which may occur during a subtraction operation when a sum digit generated by adder 12 is stored in one of the registers 13 or 14. The four possible sequences of operations are outlined below.

(1) When adder circuit 12 generates a sum digit less than TEN at a time when the count in counter 15 is ZERO, the sum digit generated by adder 12 is stored in the appropriate register 13 or 14 (n.b., the use of registers 13 and 14 is alternated as during addition), the digit which is stored in the other register 13 or 14 is gated through carry adjust circuitry 17 where it is decremented (decreased) by ONE, and the decremented digit is gated to output register 18.

(2) When the adder circuit 12 generates a sum digit greater than TEN at a time when the count in counter 15 is ZERO, the lowest order digit of the sum generated by the adder 12 is stored in the appropriate register 13 or 14 and the digit which is stored in the other register 13 or 14 is gated unchanged through carry adjust circuitry 17 to output register 18. The higher order digit of the sum is not used as such.

(3) When the adder circuit 12 generates a sum less than TEN at a time when counter 15 has a value other than ZERO stored therein, the sum digit generated by adder 12 is stored in the appropriate register 13 or 14 and the contents of the other registers 13 or 14 is gated through carry adjust circuit 17 where it is decremented by ONE, and the decremented digit is gated to output register 18. Thereafter a number of ZEROS equal to the count in counter 15 is generated by circuit 16 and gated through carry adjust circuitry 17 where the ZEROS are decremented by ONE changing them to NINES and the NINES are gated to output register 18.

(4) When the adder circuit 12 generates a sum digit greater than TEN at a time when counter 15 has a value other than ZERO stored therein, the lowest order digit of the sum is stored in the appropriate register 13 or 14 (the higher order digit of the sum is not used) and the contents of the other register 13 or 14 is gated unchanged through carry adjust circuitry 17 to ouput register 18. Thereafter a number of ZEROS equal to the count in counter 15 is generated by circuit 16 and these ZEROS are gated unchanged through carry adjust circuitry 17 to output register 18.

The general manner in which a subtraction is performed by the present invention is best understood with reference to the chart of FIG. 2*b* which shows how the number 03238413 is subtracted from the number 24508454 in order to produce the number 21270041 which represents the difference of the two foregiven numbers. As shown in the chart of FIGURE 2*b* the particular subtraction which is shown is performed in nine major steps. The particular digit of each of the numbers in registers 10 and 11 which is gated to adder 12 during each step during the subtraction is shown in bold print and underlined in the chart.

During the subtraction operation, adder circuit 12 generates the TENS complement of each digit of the smaller number and it then adds this number to the corresponding digit of the larger number. The manner in which adder circuit 12 detects which of the numbers is the smallest will be discussed later. In the case shown in FIGURE 2*b* the number in register 11 is the smaller of the two numbers in registers 10 and 11 hence adder 12 complements the digits it receives from register 11 and adds the complemented digit to the digit it received from register 10.

The operations which occur during each step of subtraction shown in FIGURE 2*b* are outlined below:

First step of the subtraction: (a) the first digit of the number in register 10 and the first digit of the number in register 11 are gated to adder circuit 12, (b) adder circuit 12 complements the digit which is received from register 11 thereby generating the number TEN, (c) adder circuit 12 adds the digit received from register 10 to the complemented digit thereby generating the sum TWELVE, and (d) since the sum is greater than TEN the lower order digit of the sum is placed in register 13.

Second step of the subtraction: (a) The second digit of the number in register 10 and the second digit of the number in register 11 are gated to adder circuit 12, (b) adder circuit 12 complements the digit which it received from register 11 generating the number SEVEN, (c) adder circuit 12 adds the digit received from register 10 to the complemented digit thereby generating the sum ELEVEN, and (d) since the sum digit is greater than TEN the lower order digit of the sum is placed in register 14, and the number TWO is gated unchanged from register 13 through carry adjust circuit 17 to output register 18.

Third step of the subtraction: (a) The third digit of the number in register 10 and the third digit of the number in register 11 are gated to adder 12, (b) adder circuit 12 complements the digit which is received from adder circuit 11 generating the digit EIGHT, (c) adder circuit 12 adds the digit received from register 10 to the complemented digit thereby generating the sum THIRTEEN, and (d) since the sum is greater than TEN the lower order digit of the sum is placed in register 13 and the digit stored in register 14 is gated unchanged through carry adjust circuitry 17 to output register 18.

Fourth step of the subtraction: (a) The fourth digit of the number in register 10 and the fourth digit of the number in register 11 are gated to adder circuit 12, (b) adder circuit 12 generates the TENS complement of the number which it received from register 11 generating the digit SEVEN, (c) adder circuit 12 adds the digit received from register 10 to the complemented digit thereby generating the sum SEVEN, and (d) since the sum is less than TEN the sum digit is placed in register 14 and the digit stored in register 13 is gated to carry adjust circuitry 17 where it is decremented by ONE and the decremented digit is then gated to ouput register 18.

Fifth step of the subtraction: (a) The fifth digit of the number in register 10 and the fifth of the number in register 11 are gated to adder circuit 12, (b) adder circuit 12 complements the digit which it received from register 11 generating the digit TWO, (c) adder circuit 12 adds the digit received from register 10 to the complemented digit thereby generating the sum TEN, and (d) since the sum digit is a TEN no information is transferred from adder 12 to either register 13 or register 14 and no information is transferred from either register 13 or 14 to output register 18 but instead the counter 15 is incremented by ONE.

Sixth step of the subtraction: (a) The sixth digit of the number in register 10 and the sixth digit of the number in register 11 are gated to adder circuit 12, (b) adder circuit 12 generates the TENS complement of the digit which it received from register 11 generating the digit SIX, (c) adder circuit 12 adds the digit received from register 10 to the complemented digit thereby generating the sum of TEN, and (d) since the sum is TEN no information is transferred from adder 12 to register 13 or register 14 and no information is transferred from register 13 or register 14 to output register 18 but instead the counter 15 is incremented by ONE, Seventh step of the subtraction: (a) The seventh digit of the number in register 10 and the seventh digit of the number in register 11 are gated to adder circuit 12, (b) adder circuit 12 complements the digit which it receives from register 11 generating the digit NINE, (c) adder circuit 12 adds the digit received from register 10 to the complemented digit thereby generating the sum FOURTEEN, and (d) since the sum FOURTEEN is greater than TEN the lower order digit of the sum is placed in register 13 and the number stored in register 14 is gated unchanged through carry adjust circuitry 17 to output register 18 and (e) since the count in counter 15 is greater than ZERO and the sum generated by adder 12 is greater than TEN steps 7A and 7B occur. During step 7A counter 15 is decremented by ONE and digit generator 16 generates a ZERO which is gated unchanged through carry adjust circuitry 17 to output register 18. During step 7B the counter 15 is decremented by ONE and digit generator 16 generates a ZERO which is gated unchanged through carry adjust circuit 17 to output register 18.

Eighth step of the subtraction: (a) The eighth digit of the number in register 10 and the eigth digit of the number in register 11 are gated to adder circuit 12, (b) adder circuit 12 complements the digit which it receives from register 11 generating the digit SEVEN, (c) adder circuit 12 adds the digit received from register 10 to the complemented digit thereby generating the sum ELEVEN, and (d) since the sum is greater than TEN the lowest order digit of the sum is stored in register 14 and the digit stored in register 13 is gated unchanged through carry adjust circuitry 17 to output register 18.

Ninth step of the subtraction: (a) Register 10 and register 11 indicate that they are empty thereby indicating that the subtraction is completed, and (b) the last sum digit generated by adder 12 which is stored in register 14 is gated unchanged through carry adjust circuitry 17 to output register 18.

The manner in which the device of the present invention determines whether the number in register 10 is larger than the number in register 11 or whether the number in register 11 is larger than the number in register 10 (i.e., so that the system will know which digit should be complemented) will now be explained with reference to the chart of FIGURE 2*c*. The actual hardware which performs the above function will be described in detail later.

Before a subtraction operation begins, the two numbers which are to be subtracted are placed in registers 10 and 11. It is not necessary to place the larger number in a particular register; however, before the system can perform the subtraction the system must determine which number is larger and which number is smaller so that the smaller number can be subtracted from the larger number. The system first begins the subtraction on the assumption that the number in register 11 is smaller than the number in register 10. If the system later finds that the assumption was incorrect, it disregards any incorrect results generated and it subtracts the number in register 10 from the number in register 11.

When the system receives the first digit from register 10 and the first digit from register 11, it complements the digit which it received from register 11 and adds the complemented digit to the digit received from register 10. If the sum thus generated is greater than TEN it means that the number in register 11 is smaller than the number in register 10 and the system proceeds to execute the subtraction operation. If the sum generated is smaller than TEN it indicates that the number in register 11 is larger than the number in register 10 and the system therefore reverses itself and thereafter complements the digits which it receives from register 10. Furthermore the system re-adds the first digits from register 11 to the complement of the first digit from register 10.

If, when the system adds the complement of the first digit received from register 11 to the first digit received from register 10 the sum which results is TEN it is an indication that the digit received from register 10 was the same as the digit received from register 11 and hence the system is not as yet able to determine whether the number in register 11 is smaller than the number in register 10 or whether the number in register 10 is smaller than the number in register 11. However, the fact that the sum is a TEN indicates that the highest order digit of the number which represents the difference between the two numbers in registers 10 and 11 is a ZERO, hence counter 15 is incremented so that a ZERO will be placed in output register 18 at the correct time. If a sum of TEN is generated when adder 12 generates the sum of the complement of the first digit from register 11 to the first digit from register 10, the system adds the second digit of the number in register 10 to the complement of the second digit of the number in register 11 and the rules set out above relative to the addition of the first two digits apply.

Stated differently, during a subtraction operation the system complements the digits received from register 11 unless the first time adder 12 produces a sum other than TEN, the sum is less than TEN. If the first sum other than TEN which adder 12 produces is less than TEN the system reverses itself and thereafter complements the digits which it receives from register 10 and adds the complement digit to the corresponding digit from register 11. In this case it also reprocesses (i.e., re-adds) the digits which generated the first sum other than TEN.

The manner in which the system determines whether the number from register 10 or the number from register 11 is greater is most easily understood with reference to the exemplary subtraction shown in FIGURE 2*c*. FIGURE 2*c* shows the steps that occur during a subtraction when the number 00043 is placed in register 10 and the number 00468 is placed in register 11. In performing a subtraction operation which the above numbers in registers 10 and 11 the system performs the following steps.

First step of the subtraction: (a) The digit of the number in register 10 and the first digit of the number in register 11 are gated to adder circuit 12, (b) adder circuit 12 complements the digit which it receives from register 11 thereby generating the number TEN, (c) adder circuit 12 adds the digit received from register 10 to the complemented digit thereby generating the sum TEN, and (d) since the sum is TEN no information is placed in register 13 or in register 14 and the counter 15 is incremented by ONE.

Second step of the subtraction: (a) The second digit of the number in register 10 and the second digit of the number in register 11 are gated to adder circuit 12, (b) adder circuit 12 complements the digit which it received from register 11 generating the number TEN, (c) adder circuit 12 adds the digit received from register 10 to the complemented digit thereby generating the sum TEN, and (d) since the sum is a TEN no information is placed in registers 13 or 14 and counter 15 is incremented by ONE.

Third step of the subtraction: (a) The third digit of the number in register 10 and the third digit of the number in register 11 are gated to adder circuit 12, (b) adder circuit 12 complements the digit which it received from register 11 generating the number SIX, (c) adder circuit 12 adds the digit received from register 10 to the complemented digit thereby generating the sum SIX, and (d) since the first sum other than a TEN generated by adder 12 is less than TEN, the adder disregards the sum SIX and it re-executes step three reversing the digit which it complements (thereafter it complements the digits from register 10).

Fourth step of the subtraction: (a) The third digits of the number in register 10 and the third digit of the number in register 11 are again gated to adder circuit 12, (b) added circuit 12 complements the digit which it received from register 10 thereby generating the number TEN, (c) adder circuit 12 adds the digit received from register 11 to the complemented digit thereby generating the sum FOURTEEN, and (d) since the sum is greater than TEN the lower order digit of the sum is placed in register 13 and since the count in counter 15 is greater than ZERO and the sum generated by adder 12 is greater than TEN steps 4A and 4B occur. During step 4A counter 15 is decremented by ONE and digit generator 16 generates a ZERO which is gated unchanged through carry adjust circuitry 17 to output register 18. During step 4B the counter 15 is decremented by ONE and digit generator 16 generates a ZERO which is gated unchanged through carry adjust circuit 17 to output register 18.

Fifth step of the subtraction: (a) The fourth digit of the number in register 10 and the fourth digit of the number in register 11 are gated to adder circuit 12, (b) adder circuit 12 complements the digit which it receives from register 10 generating the digit SIX, (c) adder circuit 12 adds the digit received from register 10 to the complemented digit thereby generating the sum TWELVE and (d) since the sum is greater than TEN, the lower order digit of the sum is placed in register 14 and the digit stored in register 13 is gated unchanged through carry adjust circuit 17 to output register 18.

Sixth step of the subtraction: (a) The fifth digit of the number in register 10 and the fifth digit of the number in register 11 are gated to adder circuit 12, (b) adder circuit 12 complements the digit which it receives from register 10 generating the digit SEVEN, (c) adder circuit 12 adds the digit received from register 11 to the complemented digit thereby generating the sum FIFTEEN and (d) since the sum is greater than TEN the lower order digit of the sum is placed in register 13 and the digit stored in register 14 is gated unchanged through carry adjust circuit 17 to output register 18.

Seventh step of the subtraction: (a) Registers 10 and 11 indicate that they are empty thereby indicating that the subtraction is completed and (b) the last sum digit generated by adder 12 which is stored in register 14 is gated unchanged through carry adjust circuitry 17 to output register 18.

*Detailed description of the components*

The details of the circuitry which control the various components includes gates 312 to 319, AND circuits 320 and 3*b* (which fit together as shown by FIGURE 3). The circuitry which controls the previously described components include gates 312 to 319, AND circuits 320 to 336 and 346, OR circuits 337 to 339 and 341 to 344, inverters (NOT circuits ) 350 to 353, flip-flop circuits 301 to 305, detectors 306 and 307, delay circuits 308 to 310 and 364 and single-shot multivibrator 365 (shown on the drawing by a block with the letters SS therein). The system has two inputs 305 and 306. When input 305 is activated, the system begins to add the two numbers which are in registers 10 and 11 and when input 306 is activated the system begins to subtract the two numbers which are in registers 10 and 11.

The numbers which are to be added or subtracted are stored in registers 10 and 11 in a code which uses seven binary positions to represent each decimal position. The seven binary positions are divided into two groups. The first group has three binary positions and the second group has four binary positions. The seven binary positions from right to left respectively have values of ZERO, ONE, TWO, THREE, ZERO, FOUR and EIGHT. For example, the decimal number FIVE is represented as the binary number 010 0010 which has a 1 in the ONE position and in the FOUR position in order to represent FIVE. The binary numbers which are used to represent the various decimal digits are given in the following table:

| Decimal Digit | Binary Representation | |
|---|---|---|
| 0 | 001 | 0001 |
| 1 | 001 | 0010 |
| 2 | 001 | 0100 |
| 3 | 001 | 1000 |
| 4 | 010 | 0001 |
| 5 | 010 | 0010 |
| 6 | 010 | 0100 |
| 7 | 010 | 1000 |
| 8 | 100 | 0001 |
| 9 | 100 | 0010 |
| 10 | 100 | 0100 |

The reason that the particular code shown above is used is that with the above code there are always two ONES in each group of seven binary bits which are used to represent any decimal number including the number ZERO. The first ONE always appears somewhere in the first three binary bits and the second ONE always appears somewhere in the second four binary bits. Using the above fact a simple detector can be built (shown in FIGURE 6 and explained later) to determine when a component has an output.

Each of the registers 10 and 11 (FIGURE 3*a*) can store nine decimal digits, that is, each of the registers 10 and 11 has sixty-three positions each of which can either be in a ONE or in a ZERO state. Registers 10 and 11 have associated therewith register access circuits 310 and 311 each of which has seven output lines.

Register access circuits 310 and 311 activate their output lines in accordance with the seven binary bits which represent a selected decimal digit in the associated registers 10 and 11. When numbers which are to be added or subtracted are placed in registers 10 and 11 register access circuits 310 and 311 are set so that their output lines are activated in accordance with the seven binary bits which represent the highest order decimal digit in the associated register 10 or 11. Thereafter the various binary bits which represent the other decimal digits of the numbers in registers 10 and 11 are sequentially gated to the output lines of register access circuits 310 and 311. Each time line 327A is activated, the next lower decimal digit from registers 10 and 11 is gated to the output lines of register access circuits 310 and 311; however, before each digit is gated to the output of register access circuits 310 and 311, the output lines are all deactivated for a short period of time.

Figure 9:
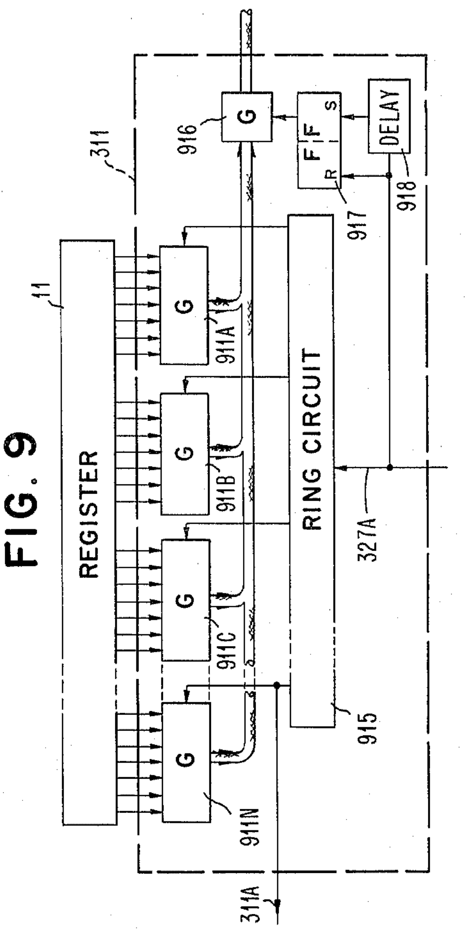
FIGURE 9 is a circuit diagram of a register access circuit.

The details of the circuitry in register access circuit 311 (which is identical to the circuitry in register access circuit 310) is shown in FIGURE 9. Register access circuit 311 includes multibit gates 911A to 911N and 916, ring circuit 915, flip-flop 917 and delay circuit 918. Each seven bits in register 11 which are used to store one decimal digit have an associated multibit gate, respectively 911A to 911N. The gates 911A to 911N are controlled by the output of ring circuit 915. Ring circuit 915 has a plurality of outputs, one and only one of which is activated at any particular time. Each time input 327A is active, the ring is advanced one position.

When the last position of ring circuit 915 is activated output 311A is also activated. In addition to passing through one of the gates 911A to 911N the outputs of register 11 must also pass through gate 916. The purpose of gate 916 is to deactivate the output of the register access circuit for a short period of time before each new decimal digit is gated to adder 12. Gate 916 is only conditioned to pass a bit of data when flip-flop 917 is in the set condition. When line 327A is activated, flip-flop 917 is reset thereby deactivating the output of gate 916. The activation of line 327A also advances ring circuit 915A and thereby gates the next decimal digit from register 11 to gate 916. A short time thereafter the output of delay circuit 918 sets the flip-flop 917 thereby activating gate 916 and gating the next decimal digit to adder 12. The length of delay 918 should be sufficient to allow the circuitry in the system to stabilize between the addition of different digits.

Two different types of interconnections between the various components are shown in the figures. Certain connections are shown merely by single lines such as line 327A and other connections are shown by cable, such as cable 312A. Each single line merely transmits one control signal. Each cable has seven lines therein which can transmit the seven binary bits which represent one decimal digit.

Each of the registers 13 and 14 (FIGURE 3*b*) can store one decimal digit. That is, each register 13 and 14 can store seven binary bits. Each register has an input cable, an output cable and a control line. A digit supplied to the input cable is stored in the register and the output cable is activated in accordance with the digit stored in the register. When the control line for a register is activated each of the bit positions in the register is set to the ZERO state thereby indicating that no information is stored in the particular register. Stated differently, when the control line of either register 13 or of register 14 is activated the respective register is set to the blank condition. Output register 18 is representative of a utilization device. In its simplest form it could merely store the digits which appear at the output of carry adjust circuitry 17.

Gate circuits 312 to 319, 914A to 914N and 916 are multidigit gates which connect each one of the seven lines in the cable which forms an input to the gate to one of the seven lines in the cable which forms the output of the gate. Each gate has a control line and when the control line is activated signals which appear on the cable which is the input to the gate are transmitted to the cable which forms the output to the gate. When the control line is not activated, signals which appear on the cable which forms the input of the gate are not transmitted to the cable which forms the output of the gate.

Figure 10:
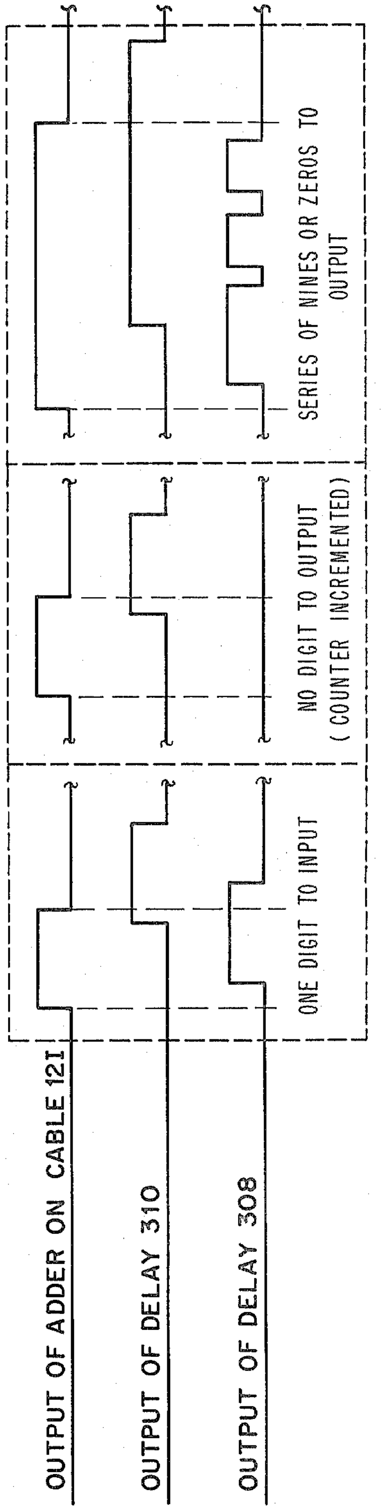
FIGURE 10 is a timing diagram.

Each of the AND circuits 320 to 336 and 346 is a conventional AND circuit which has a plurality of inputs and a single output. When all of the inputs to any particular AND circuit are activated the output of the particular AND circuit is activated. Each of the OR circuits 337 to 339 and 341 to 344 is a conventional OR circuit which has a plurality of inputs and a single output. When any one of the inputs to a particular OR circuit is activated the output from the particular OR circuit is activated. Inverters 350 to 353 are conventional inverters which have a single input and a single output. When the output to any particular inverter is activated, the output of the particular inverter is not activated and when the input to a particular inverter is not activated the output of the particular inverter is activated. Delay circuits 308 to 310 and 918 are conventional delay circuits which insure that the various pulses arrive at the various circuits at the correct time. A timing diagram is shown in FIGURE 10. The single shot multivibrator circuit 315 is conventional in design. It has been an input 305A and an output 315A. Each time the input 305A goes from the off condition to the on condition a pulse appears on the output 315A.

Flip-flop circuits 301 to 305 are conventional bistable flip-flop circuits. The two stable states of each flip-flop will respectively be designated as the left state and the right state. Flip-flop 301 has two inputs hereinafter designated as the right input and the left input and two outputs hereinafter designated as the right output and the left output. When the right input is activated the flip-flop is switched to the right stable state and when the left input is activated the flip-flop is switched to the left stable state. When the flip-flop is in the right stable state the right output is continuously activated and when the flip-flop is in the left stable state the left output is continuously activated. Flip-flops 302, 303 and 304 are each identical to flip-flop 301 except that each only has a right output. Flip-flop 304 (FIGURE 3*b*) is a complementing flip-flop which has right and left stable states and right and left outputs 304A and 304B. However, flip-flop 304 only has one input 304C. Each time the input 304C is activated flip-flop 304 changes its state.

Counter assembly 15 has two inputs 15A and 15B, and an output 15C. Each time input 15A is activated the counter is advanced ONE position. Each time input 15B is activated the counter is decremented ONE position. Whenever the counter has a value stored therein other than ZERO a series of pulses is emitted on output 15C.

Figure 8:
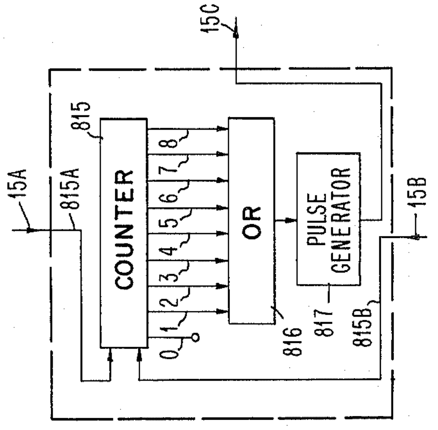
FIGURE 8 is a circuit diagram of the counter assembly.

The details of counter assembly 15 are shown in FIGURE 8. The counter assembly includes a counter 815, a multi-input OR circuit 816 and a pulse generator 817. The counter 815 has two inputs 815A and 815B and eight outputs designated 0 to 8. One and only one output is active at any particular time. Each time line 815A is activated the counter is incremented ONE position, and the output then active is deactivated and the next output in the sequence is activated. Each time line 815B is activated the counter is decremented by ONE position, and the output then active is deactivated and the next lower output is activated. The counter is cyclic, that is, as the counter is incremented after it reaches the eight position it returns to the ZERO position and as the counter is decremented after it reaches the ZERO position it returns to the eighth position. Herein an eight position counter is shown. This means that the circuit can only handle eight successive sums of NINE. Naturally a larger counter could be used. Whenever the counter is at a value other than ZERO the output of OR circuit 816 is active thereby activating the input of pulse generator 817. Pulse generator 817 supplies a series of pulses on output 15C when it is activated. The timing of the pulses is discussed later.

Detector 306 detects when adder circuit 12 has an output and detector 307 detects when carry adjust circuitry 17 has an output. The specific circuitry in detector 306 is shown in FIGURE 6. The circuitry in detector 307 is identical to the circuitry in detector 306. As previously described each decimal digit is represented by seven binary bits which are divided into two groups. Detector 306 has two OR circuits 601 and 602 and an AND circuit 603. The inputs to OR circuits 601 and 602 are connected to the lines in cable 12I. OR circuit 601 detects when any one of the lines associated with the first group of bits is active and OR circuit 602 detects when any one of the lines associated with the second group of bits is active. The output of OR circuits 601 and 602 form the input to AND circuit 603; hence, the output of AND circuit 603 is only active when the outputs of each of the OR circuits 601 and 602 are active. The output of AND circuit 603 gives an indication when one line in each group of lines in cable 12I is active, therefore it gives an indication when there is a signal on the cable 12I.

Digit generator 16 (FIGURE 3*b*) has three input lines, 16A, 16B and 16C and an output cable 16D. When inputs 16A and 16B are simultaneously activated a NINE is generated on output 16D and when inputs 16A and 16C are simultaneously generated a ZERO is generated on output 16D. The details of the circuitry in digit generator 16 are shown in FIGURE 7. Digit generator 16 consists of four AND circuits 701 to 704. The output of AND circuits 701 and 702 are connected to the ZERO digit lines in cable 16D and the output of AND circuits 703 and 704 are respectively connected to the EIGHT and ONE digit lines in output cable 16D. Hence, when the outputs of AND circuit 701 and 702 are activated a ZERO digit is generated and when the output of AND circuits 703 and 704 are activated a NINE digit is generated.

Each of the AND circuits 701 and 702 have one input connected to input 16A and a second input connected to input 16B and each of the AND circuits 703 and 704 have one input connected to inputs 16A and a second input connected to input 16C. Hence, the outputs of AND circuit 701 and 702 are activated when inputs 16A and 16B are simultaneously activated and the outputs of AND circuits 703 and 704 are activated when inputs 16A and 16C are simultaneously activated.

*Detailed description of adder circuit 12*.—Adder circuit 12 (FIGURE 3*a*) has two input lines 12A and 12B, two input cables 12G and 12H, four output lines 12C to 12F and an output cable 12I. When input 12B is activated the decimal digits received from input 12H are added to a digit received on input 12G and the output 12I is activated so as to indicate the lower order digit of the sum generated at any particular time. If the sum generated at any particular time is a NINE line 12C is activated and if it is a TEN line 12D is activated. If the sum generated at any particular time is smaller than TEN indicating that there is no carry if an addition is being performed or that there is a borrow if a subtraction is being performed, line 12E is activated. If the sum generated at any particular time is greater than TEN indicating that there is a carry if an addition is being performed or that there is no borrow if a subtraction is being performed, line 12F is activated.

When input line 12A is activated each digit received on input 12G is complemented and the complemented digit is added to the digit which is simultaneously received on input 12H. Output 12I is activated in accordance with the lowest order digit of the sum. If the sum is greater than TEN line 12F is activated, if the sum is less than TEN line 12E is activated, if the sum is a NINE line 12C is activated, and if the sum is a TEN line 12D is activated.

Figures 4, 4A:
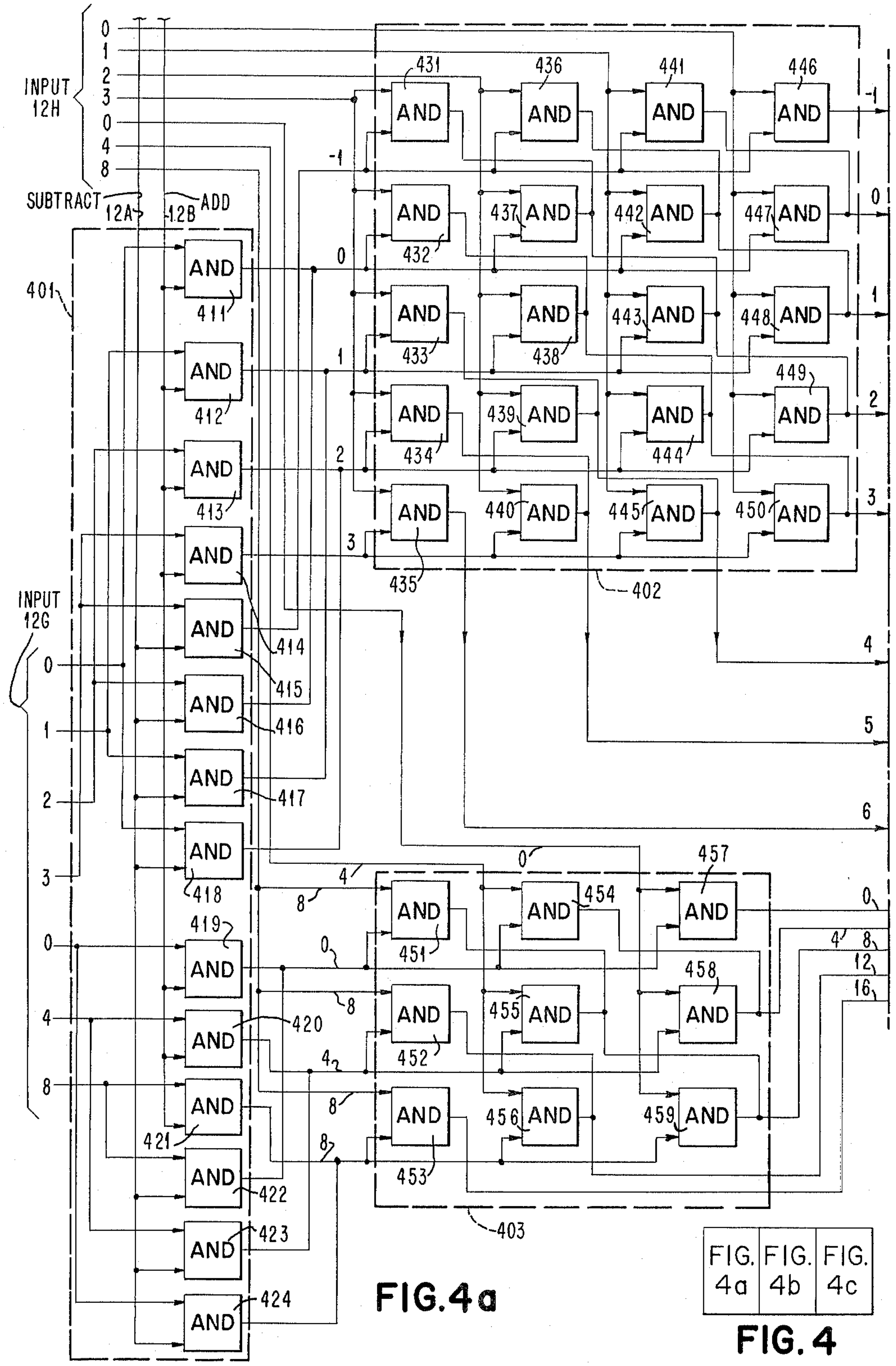
Figure 4B:
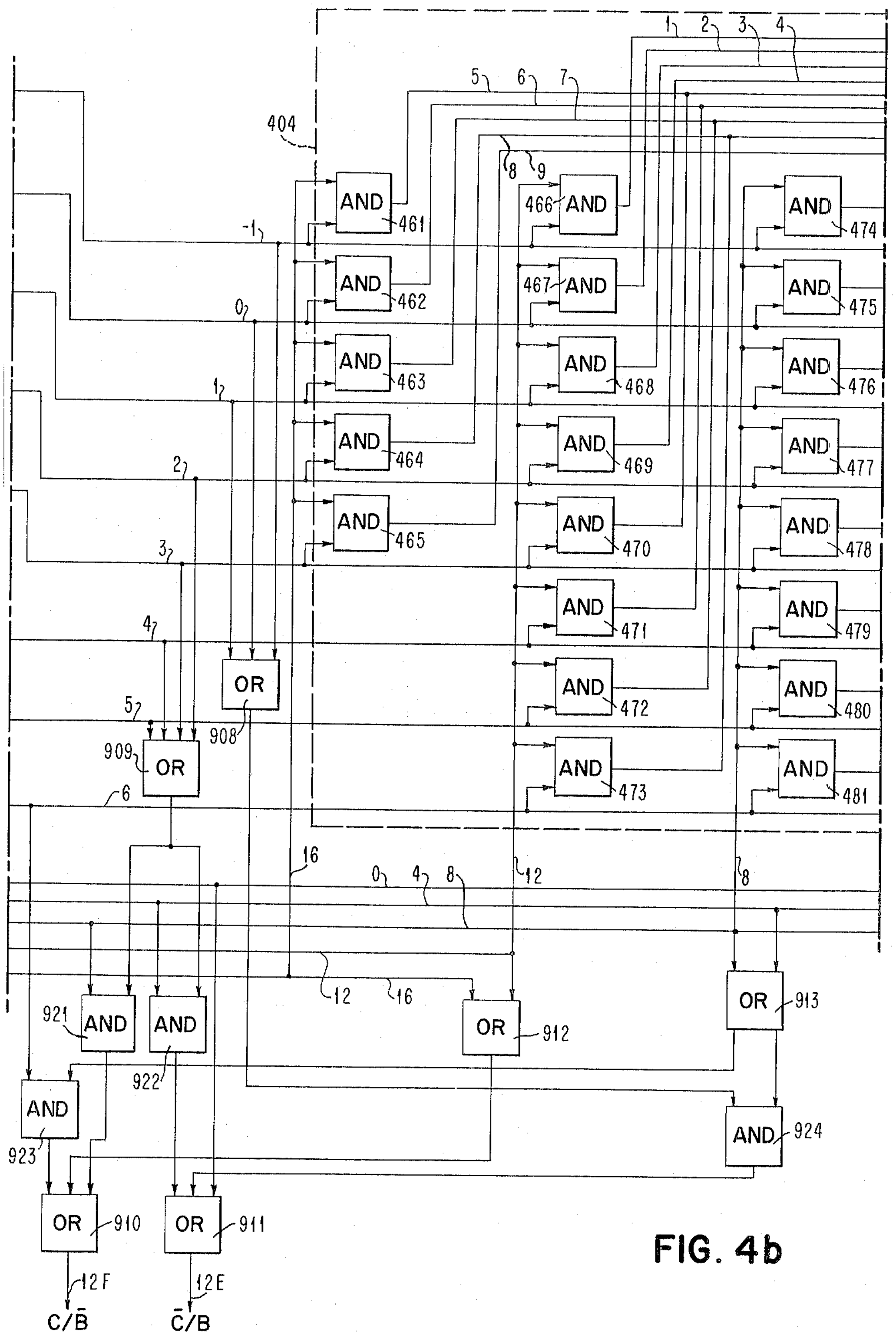
Figure 4C:
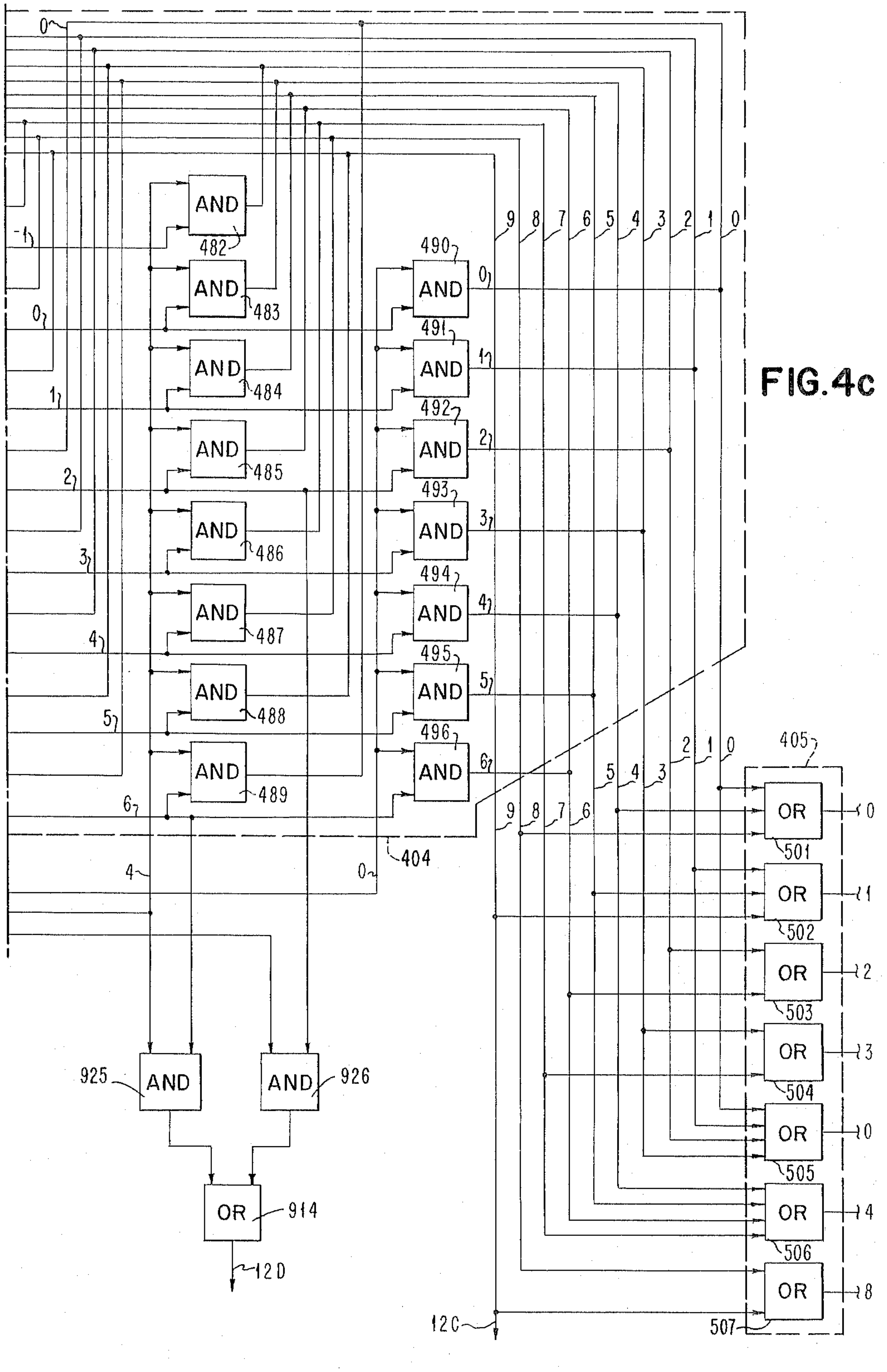

The details of the circuitry in adder 12 are shown in FIGURES 4*a*, 4*b* and 4*c* which fit together as shown in FIGURE 4. As previously explained the decimal digits which adder circuit 12 receives from cable 12H and from stable 12G and the decimal digit which adder 12 produces on line 12I are in the form of seven binary bits which represent a decimal digit. The seven binary bits from each cable respectively have values of ZERO, ONE, TWO, THREE, ZERO, FOUR and EIGHT. The numbers on the lines in FIGURES 4*a*, 4*b* and 4*c* indicate the values which signals on the various lines indicate.

The circuitry in adder 12 is arranged in five major groups 401 to 405 each of which will be explained separately. Circuit 401 has fourteen AND circuits 411 to 424 and it has as inputs, lines 12A and 12B and the seven lines from cable 12G, each of which indicates a binary bit having a particular value. If input 12B is activated circuit 401 gates the four binary bits which respectively have values of ZERO, ONE, TWO and THREE through AND circuits 411 to 413 to circuit 402 and the three binary bits which respectively have values of ZERO, FOUR and EIGHT through AND circuits 419 to 421 to circuit 403. If input 12A is activated circuit 401 generates the TENS complement of the decimal digit received from cable 12G. The TENS complement of a decimal digit is the difference between the decimal digit and TEN. For example, the TENS complement of EIGHT is TWO. The various decimal digit inputs, their TENS complement and the output lines which are activated to indicate the complement of each decimal digit are set out in the table below.

| Value of Input | Inputs Activated (Values of activated Inputs) | | Value of TENs Complement | AND Circuits Activated | Outputs of Circuit 401 Which are Activated |
|---|---|---|---|---|---|
| | 840 | 3210 | | | |
| 0 | 001 | 0001 | 10 | 418 and 424 | 2 and 8 |
| 1 | 001 | 0010 | 9 | 417 and 424 | 1 and 8 |
| 2 | 001 | 0100 | 8 | 416 and 424 | 0 and 8 |
| 3 | 001 | 1000 | 7 | 415 and 424 | −1 and 8 |
| 4 | 010 | 0001 | 6 | 418 and 423 | 2 and 4 |
| 5 | 010 | 0010 | 5 | 417 and 423 | 1 and 4 |
| 6 | 010 | 0100 | 4 | 416 and 423 | 0 and 4 |
| 7 | 010 | 1000 | 3 | 415 and 423 | −1 and 4 |
| 8 | 100 | 0001 | 2 | 418 and 422 | 2 and 0 |
| 9 | 100 | 0010 | 1 | 417 and 422 | 1 and 0 |

Circuit 402 has twenty AND circuits 431 to 450 arranged in a matrix. The first set of inputs to AND circuit matrix consists of the four binary bits which have values of ZERO, ONE, TWO and THREE from input 12H and the second set of inputs to the matrix consists of the five outputs of circuit 401 which respectively have values of MINUS ONE, ZERO, ONE, TWO and THREE. Circuit 402 generates the sum of the inputs which it received from line 12H and from circuit 401. Since the first input may range from ZERO to THREE and the second input may range from MINUS ONE to THREE, the sum may range from MINUS ONE to SIX. Circuit 402 has seven output lines one of which is activated in order to indicate any particular sum between MINUS ONE to SIX.

Circuit 403 has nine AND circuits 451 to 459 arranged in a matrix. The first set of inputs to the AND circuit matrix 403 consists of the four binary bits which have values of ZERO, FOUR and EIGHT from input 12H and the second set of inputs consists of three outputs of circuit 401 which respectively have values of ZERO, FOUR and EIGHT. Circuit 403 generates the sum of the inputs received from input 12H and the input received from circuit 401. Since first input may range from ZERO to EIGHT and the second input may range from ZERO to EIGHT, the sum may be either a ZERO, a FOUR, an EIGHT, a TWELVE or a SIXTEEN. Circuit 403 has five output lines one of which is associated with each of the sums which the circuit may produce.

Circuit 404 has thirty-six AND circuits 461 to 496 arranged in a matrix. There are two sets of inputs to the matrix and each AND circuit has one input from each set of inputs. The first set of inputs comes from circuit 402 and the second set of inputs comes from circuit 403. The first set of inputs represents a number from MINUS ONE to SIX and the second set of inputs represents a number which is either ZERO, FOUR, EIGHT, TWELVE or SIXTEEN. Circuit 404 generates the lowest order digit of the sum of the two numbers received on the two sets of inputs. The lower order sum digit generated by circuit 404 may range from ZERO to NINE and circuit 404 has ten output lines one of which is associated with each of the sums from ZERO to NINE. There is one AND circuit for each possible combination of inputs and each AND circuit activates the appropriate output in response to the inputs.

Circuit 405 has seven OR circuits 501 to 507 which decode the output of circuit 404 into the previously described seven bit binary code representation of a decimal digit. The nine outputs of circuit 404 form the inputs of OR circuits 501 to 501 and the outputs of circuit 501 to 505 activate the lines in output cable 12I. The following table indicates the outputs of circuit 405 which are activated in response to each of the nine inputs.

| Input: | Output |
|---|---|
| 0 | 001 0001 |
| 1 | 001 0010 |
| 2 | 001 0100 |
| 3 | 001 1000 |
| 4 | 010 0001 |
| 5 | 010 0010 |
| 6 | 010 0100 |
| 7 | 010 1000 |
| 8 | 100 0001 |
| 9 | 100 0010 |

In addition to the above described circuits 401 to 405 which activate the lines in output cable 12I, adder circuit 12 also has seven OR circuits 908 to 914 and six AND circuits 921 to 926 for activating outputs 12D, 12E and 12F. Output 12D is activated whenever the sum generated by circuit 404 is a TEN. There are only two different combinations of inputs to circuit 404 which can generate a sum of TEN. The first is an input of SIX from circuit 402 and an input of FOUR from circuit 403, and second is an input of TWO from circuit 402 and an input of EIGHT from circuit 403. The outputs of AND circuits 925 and 926 are respectively activated when the above conditions occur and when either the output of AND circuit 925 or the output of AND circuit 926 is activated, OR circuit 914 is activated thereby activating output 12D.

Output 12E is activated whenever the output of circuit 404 is less than TEN and output 12F is activated whenever the output of circuit 404 is greater than TEN. OR circuits 908 to 913 and AND circuits 921 to 924 activate outputs 12E and 12F under the following conditions. The output of OR circuit 908 is activated whenever the input to circuit 404 from circuit 402 is less than TWO and the output of OR circuit 509 is activated whenever the input to circuit 404 from circuit 402 is between TWO and FIVE. The output of OR circuit 912 is activated whenever the input to circuit 404 from circuit 403 is either TWELVE or SIXTEEN and the output of OR circuit 913 is activated whenever the input to circuit 404 from circuit 403 is either a FOUR or an EIGHT. AND circuit 924 has two inputs which must be simultaneously activated in order to activate its output. The first input is connected to the output or OR circuit 913 and the second input is connected to the output of OR circuit 908. Hence, the output of AND circuit 924 is not activated unless the input to circuit 404 is less than TWO (the output of OR circuit 908 must be activated) and the input to circuit 404 from circuit 402 is either a FOUR or an EIGHT (the output of OR circuit 913 must be activated).

Output 12E is activated through OR circuit 911 whenever any one of the three following conditions occur: (1) the ouput of AND circuit 924 indicates that the input to circuit 404 from circuit 402 is less than ONE and the input to circuit 404 from circuit 402 is a FOUR or an EIGHT hence indicating that the sum will be less than TEN. (2) The input to circuit 404 from circuit 403 is a ZERO thereby indicating that the sum must be less than TEN or (3) the output of AND circuit 922 is activated indicating that the input to circuit 404 from circuit 402 is between TWO and FIVE and the input to circuit 404 from 403 is a FOUR, hence indicating that the sum is less than TEN.

Output 12F is activated through OR circuit 910 whenever any one of the following conditions occur: (1) The output of OR circuit 12 indicates that the input to circuit 404 from circuit 403 is either a TWELVE or a SIXTEEN indicating that the sum must be greater than TEN, (2) the ouput of AND circuit 921 is activated indicating that the input to circuit 404 from circuit 403 is an EIGHT and that the input to circuit 404 from circuit 402 is between FIVE and TWO indicating that the sum must be greater than TEN or (3) the output of AND circuit 923 indicates that the input to circuit 404 from circuit 402 is a SIX and that the input to circuit 404 from circuit 402 is either a FOUR or an EIGHT thereby indicating that the sum is greater than TEN.

Hence, output 12E is activated whenever the sum generated by adder 404 is less than TEN and the output 12F is activated whenever the sum generated by the adder 404 is greater than TEN.

*Carry adjust circuitry* 17.—Carry adjust circuitry 17 has an input cable 17D and an output cable 17E and three control lines, 17A, 17B and 17C. Depending upon which of the control lines 17A, 17B or 17C is activated, a digit supplied to the input 17D is either incremented by ONE, not changed, or decremented by ONE before it is transmitted to the output 17E. If control line 17E is activated the digit is incremented by ONE, if control line 17B is activated the digit is transmitted through carry adjust circuitry 17 without change and if the control line 17C is activated the digit is decremented by ONE.

Figure 5:
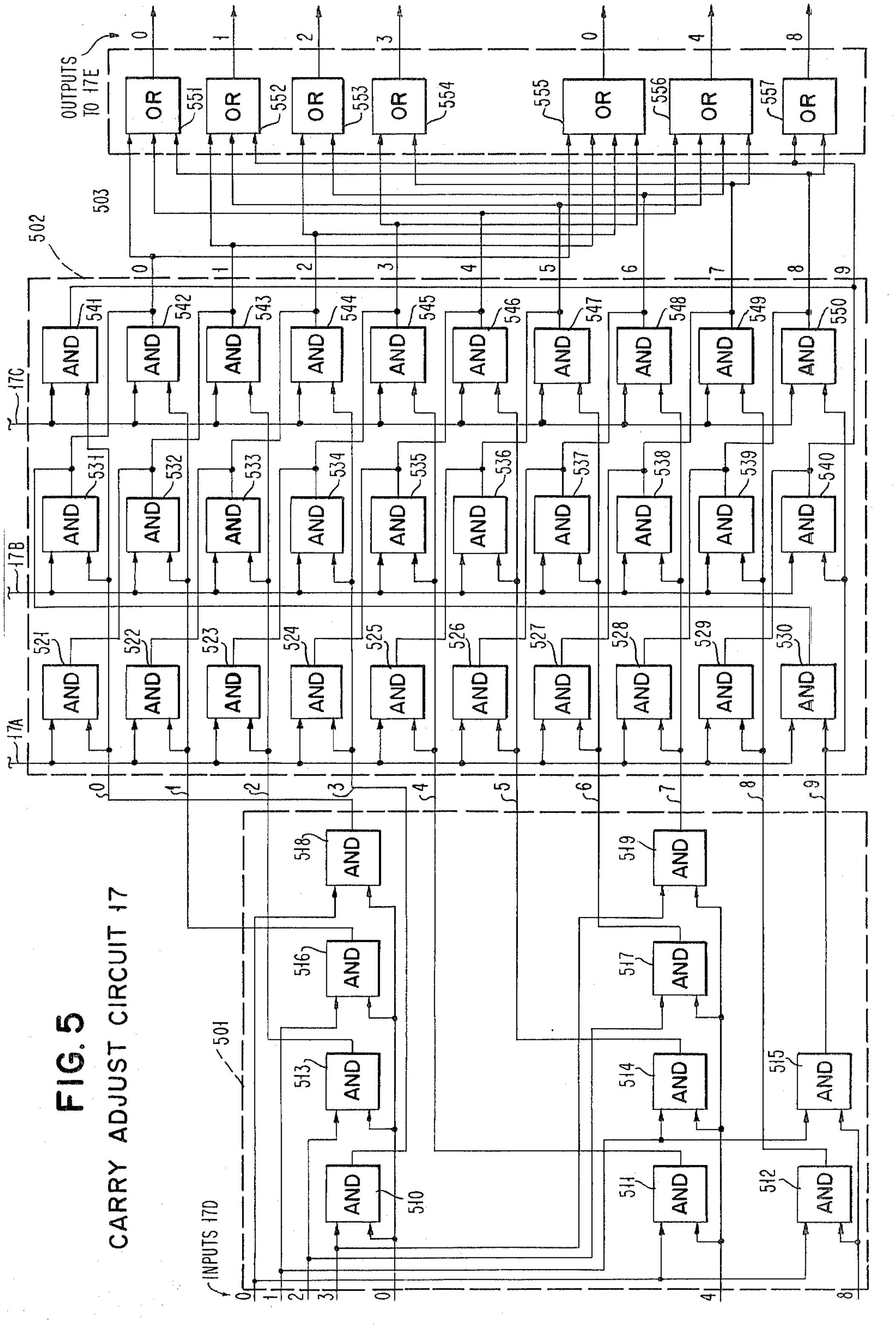
FIGURE 5 is a circuit diagram of the carry adjust circuitry.

The details of carry adjust circuitry 17 are shown in FIGURE 5. Carry adjust circuitry 17 has three major groups components 501, 502 and 503. Circuit 501 has ten AND circuits 510 to 515, circuit 502 has thirty AND circuits 521 to 550 and circuit 503 has seven OR circuits 551 to 557.

Circuit 501 is a conventional matrix decoding circuit which decodes the digit received on cable 17D which is in the previously described seven bit binary code into a code where a single line represents each decimal digit. Circuit 501 has nine output lines which are respectively associated with the decimal digits ZERO to NINE and the various output lines are activated by AND circuits 510 to 519 in order to indicate the associated digits.

Circuit 502 receives the outputs of circuit 501; and also the three inputs 17A, 17B and 17C. Circuit 502 has nine output lines which are respectively associated with the decimal digits ZERO to NINE. It should be noted that each of the AND circuits in circuit 502 has one input connected to the output of circuit 501 and one input connected to one of the inputs 17A, 17B or 17C. The various outputs which are activated by the various AND circuits and the inputs which activated each AND circuit are tabulated below:

OPERATIONS PERFORMED BY CIRCUIT 502

| AND Circuit | First input from circuit 501 | Second Input | Output Activated |
|---|---|---|---|
| 521 | ZERO | 17A | ONE |
| 522 | ONE | 17A | TWO |
| 523 | TWO | 17A | THREE |
| 524 | THREE | 17A | FOUR |
| 525 | FOUR | 17A | FIVE |
| 526 | FIVE | 17A | SIX |
| 527 | SIX | 17A | SEVEN |
| 528 | SEVEN | 17A | EIGHT |
| 529 | EIGHT | 17A | NINE |
| 530 | NINE | 17A | ZERO |
| 531 | ZERO | 17B | ZERO |
| 532 | ONE | 17B | ONE |
| 533 | TWO | 17B | TWO |
| 534 | THREE | 17B | THREE |
| 535 | FOUR | 17B | FOUR |
| 536 | FIVE | 17B | FIVE |
| 537 | SIX | 17B | SIX |
| 538 | SEVEN | 17B | SEVEN |
| 539 | EIGHT | 17B | EIGHT |
| 540 | NINE | 17B | NINE |
| 541 | ZERO | 17C | NINE |
| 542 | ONE | 17C | ZERO |
| 543 | TWO | 17C | ONE |
| 544 | THREE | 17C | TWO |
| 545 | FOUR | 17C | THREE |
| 546 | FIVE | 17C | FOUR |
| 547 | SIX | 17C | FIVE |
| 548 | SEVEN | 17C | SIX |
| 549 | EIGHT | 17C | SEVEN |
| 550 | NINE | 17C | EIGHT |

Circuit 503 which includes the seven OR circuits 551 to 557 decodes the output from circuit 502 into the previously described seven bit binary code representation of a decimal digit. Circuit 503 is similar to the previously described circuit 405 in adder circuit 12 and hence no further description thereof will be given.

*Details of circuit operation*

ADDITION: The sequence of operations which occur during an addition will now be explained with reference to the hardware shown in FIGURES 3*a* and 3*b*. Before the addition operation begins the numbers which are to be added are placed in registers 10 and 11. A "start addition pulse" on input 305 is supplied in order to start the addition. The pulse on input 305 (through OR circuit 337) switches latch 301 to the left stable state which activates output 301A thereby conditioning gates 312 and 314 to transfer the first (i.e., the highest order) decimal digit from register 10 and the first (i.e., the highest order) decimal digit from register 11 to adder 12. The start addition pulse on input 305 also switches latch 302 to the left stable state activating output 302A and adder input 12B.

Since input 12B is activated adder 12 generates the sum of the two digits which it receives from registers 10 and 11. Detector 306 detects when adder 12 has completed generating the sum and when adder 12 has completed the generation of a sum the output of detector 306 conditions OR circuit 343 and AND circuit 327 thereby activating line 327A which advances register access circuits 310 and 311 so that the next lower decimal digit is ready to be gated from registers 10 and 11 to adder 12.

The state of flip-flop 304 controls gates 316 and 317 through AND circuits 333 and 335. Hence, the state of flip-flop 304 determines whether the sum generated by adder 12 is stored in register 13 or in register 14. It should, however, be recalled that when adder 12 generates a sum of NINE, the sum is not stored in either register 13 or in register 14. AND circuits 333 and 335 prevent (in a manner which will be explained) sums of NINE from being stored in registers 13 and 14. Each time that the detector 306 senses that adder 12 has an output other than NINE the state of flip-flop 304 is changed through the action of delay circuit 310, OR circuits 343, AND circuit 346 and AND circuit 328. When the system is performing an addition and adder 12 generates a sum of NINE the output of AND circuit 322 is activated activating the output of OR circuit 339, thereby deactivating the output of inverter 351 and the output of AND circuit 346. Deactivating the output of AND circuit 346 deconditions input 328A of AND circuit 328. When input 328A of AND circuit 328 is deconditioned the signal received on line 306 which indicates that the addition is complete is not effective to complement flip-flop 304.

Hence, each time that adder 12 generates a sum (other than NINE) the state of flip-flop circuit 304 is changed so that the sums generated by adder 12 (other than sums of NINE) are alternately gated to registers 13 and 14. The deactivation of the output of inverter 351 when a sum of NINE is generated also deactivates one of the inputs to AND circuits 333 and 335 thereby preventing the sum of NINE from being stored in register 13 or register 14.

When a digit is stored in one of the registers 13 or 14 the digit stored in the other registers 13 or 14 is gated to carry adjust circuit 17 through gates 318 and 319. Gates 318 and 319 are controlled by AND circuits 334 and 336, so that each time a digit is stored in register 13 a digit is gated from register 14 and each time a digit is stored in register 14 a digit is gated out of register 13.

Registers 13 and 14 are set to the number supplied to the input cables through gates 316 and 317. All of the bit positions in the registers are reset to the ZERO state (thereby indicating that there is not a digit stored in the register) by OR circuits 341 and 342. Register 13 is reset through OR circuit 342 and AND circuit 325 each time that a digit is transferred from register 13 through gate 18 to output 18 and register 14 is reset each time a digit is transferred from register 13 through gate 318 to output register 18.

Each time adder 12 generates a sum of NINE the counter 15 is incremented by ONE. AND circuit 322 and OR circuit 339 increments counter 15 at the proper time in the following manner. Each time adder circuit 12 generates a sum of NINE it activates output line 12C and since line 303A is active thereby activating one of the inputs to AND circuit 322 each time output 12C is activated by adder circuit 12, the output of AND circuit 322 is activated. The output of AND circuit 322 is an input to OR circuit 339 and hence each time the output of AND circuit 322 is activated the output of OR circuit 339 is activated and counter 15 is incremented by ONE.

As will be seen when adder 12 generates a sum other than NINE at a time when counter 15 has a count other than ZERO therein, digit generator 16 emits a number of NINES equal to the count in counter 15. When adder circuit 12 generates an output other than NINE, output line 12C is not activated and hence AND circuit 322 and OR circuit 339 do not activate the input to inverter 351 and hence the output of inverter 351 activates input 323A of AND circuit 323. If counter 15 has a count other than ZERO therein, line 323B is also activated. Line 323C is activated by delay circuit 308 a slight time after detector 307 senses an output from carry adjust circuitry 16. Hence, all three inputs to AND circuit 323 are activated when (1) counter 15 has a count other than ZERO therein, (2) adder circuit 12 generates a sum other than NINE, and (3) the sum generated by adder 12 has been stored in one of the registers 13 or 14 and the sum stored in the other register 13 or 14 has been transferred through carry adjust circuitry 17 to output register 18. When the above three conditions are fulfilled the output of AND circuit 323 is activated thereby activating input 16A of digit generator 16.

When the output 302A of flip-flop 302 is activated, input 16B of digit generator 16 is activated. Hence, during an addition operation input 16B of digit generator 16 is always activated and when input 16A is activated by AND circuit 323 digit generator 16 generates a NINE on output cable 16C.

As previously explained if adder 12 generates a sum less than NINE at a time when the count in counter 15 is at some value greater than ZERO, digit generator 16 generates a number of NINES equal to the count in counter 15 and these NINES are passed unchanged through carry adjust circuit 17 to output register 18. When adder 12 generates a sum less than NINE output 12E is activated, thereby activating one of the inputs to AND circuit 331 (top of FIGURE 3*b*). The second input to AND circuit 331 is activated by the output 302A of flip-flop 302. Hence, when an addition operation is being performed and adder 12 generates a sum less than NINE (thereby activating output line 12E) both of the inputs to AND circuit 331 are activated and the output of AND circuit 331 activates one of the inputs to OR circuit 344. The output of OR circuit 344 activates inputs 17B of carry adjust circuit 17. Hence, the NINES generated by digit generator 16 are passed unchanged through carry adjust circuitry 17 when the generation of the NINES was initiated by a sum from adder 12 less than NINE. As previously explained when adder 12 generates a sum greater than NINE at a time when counter 15 has a value greater than ZERO therein digit generator 16 generates a plurality of NINE equal to the count in counter 15 and these NINES are passed to carry adjust circuitry 17 where they are incremented by ONE changing them to ZEROS; and the ZEROS are passed to output register 18. When adder 12 generates a sum greater than NINE output 12F is activated thereby activating one of the inputs to AND circuit 329 (top of FIGURE 3*b*). The second input to AND circuit 329 is activated by the output 302A of flip-flop circuit 302. Hence, when an addition operation is being performed and adder 12 generates a sum greater than NINE the output of AND circuit 329 is activated, activating input 17A of carry adjust circuitry 17. When input 17A of carry adjust circuitry 17 is activated the numbers received on cable 16D are incremented by ONE.

As previously explained, when counter assembly 15 has a value other than ZERO stored therein, the output 15C of the counter assembly 15 is activated by a series of pulses and hence, input 323B of AND circuit 323 is activated by a series of pulses. When line 15C is active and a sum other than NINE is generated, a digit is transferred to the output register 18 in the normal fashion. Some time thereafter the output of detector 308 is activated thereby activating input 323C of AND circuit 323 and allowing the pulses on line 15C to pass through AND circuit 323. Each of these pulses causes digit generator 16 to emit one digit which passes through carry adjust circuit 17 and through detector 307 thereby activating the output of delay circuit 308 some time later. The output of delay circuit 308 and hence the input 323C of AND circuit 323 may become inactive for a certain period of time before enough pulses have passed through AND circuit 323 to decrement the counter 15 to ZERO. However, this will not cause any trouble since each pulse which passes through AND circuit will, after a certain delay, activate the output of delay circuit 308 and hence input 323C of AND circuit 323. The only restriction is that the pulses on line 15C should be longer in duration than the time period between pulses so that at least a part of each pulse which appears on input 323C will coincide with a part of another pulse on line 15C if line 15C is active. If the circuitry which resets registers 13 and 14 to deactivate these outputs is slower than the circuitry which activates the output of digit generator 16 the output of one of the registers 13 or 14 may be active at the same time as the output of digit generator 16. This could cause a false output. If the above race condition exists is can be eliminated by putting a delay circuit in series with input 16A of digit generator 16.

The pulses which appear on the output of AND circuit 323 also activate the input of inverter 352 through OR circuit 340 and delay circuit 364 thereby deactivating one of the inputs of AND circuit 327 and preventing the advance of register access circuits 310 and 311. The length of delay circuit 364 should be slightly shorter than the length of the pulses which appear on output 15C. Since the time between the pulses on output 15C is shorter than the length of the pulses, the first pulse which appears on the output of AND circuit 323 activates the input of inverter 352 through OR circuit 340 and before the first pulse is terminated the beginning of the first pulse will have passed through delay circuit 364 thereby holding the input of inverter 352 active during the time period between pulses on output 15C.

FIGURE 10 is a timing diagram. It shows three examples of sequences of operations. The first example relates to the situation which occurs after adder 12 generates a sum digit and this results in one sum digit being gated to output register 18, the second example relates to the situation which occurs when after adder 12 generates a sum digit and no digits are gated to output register 18 (instead counter 15 would be incremented) and the third example relates to the situation which occurs when adder 12 generates a sum digit and a plurality of digits are gated to output register 18 (this occurs when a number of ZEROS or NINES are gated to output register 18).

In the first example, after the output of adder 12 is activated, a digit passes through detector 306 and a different digit (generated by a previous output of adder 12 and stored in either register 13 or 14) passes through the detector 307. A relatively short time thereafter the output of delay circuit 308 is activated and this output initiates such operations as the clearing of registers 13 or 14 through AND circuits 324 and 325 and OR circuits 341 and 342. Delay circuit 310 introduces a longer delay than delay circuit 308, hence, the output of delay 310 is activated after the output of delay 308. The output of delay circuit 310 through OR circuit 343 and AND circuit 327 activates line 327A thereby advancing register access circuits 310 and 311. When line 327A is activated the output of adder 12 is deactivated through the action of flip-flop circuit 917 shown in FIGURE 9. Some time thereafter (not explicitly shown on the timing diagram) the next digit is gated into adder 12 when delay circuit 918 resets flip-flop 917.

The second example relates to the situation which occurs when after adder 12 generates a sum digit no digit is gated to output register 18. In this case the output of delay circuit 310 activates line 327A, and some time thereafter the output of adder 12 is terminated as in the first example. In this example the output of delay circuit 308 is never activated.

The third example relates to the situation which occurs when adder 12 generates an output digit and in response thereto a plurality of digits are gated to output register 18. In this case, when the output of delay circuit 310 is activated line 327A is not activated because the output of inverter 352 is held inactive through the action of OR circuit 340 and delay circuit 364. Hence, when the output of delay circuit 310 is activated the output of adder 12 is not terminated until all of the digits are gated to output register 18. When the output of inverter 352 is activated line 327A is activated and the output of adder 12 is terminated. Some time thereafter the output of delay circuit 310 is terminated.

After register access circuits 310 and 311 have gated each of the digits from registers 10 and 11 to adder 12, register access circuit 311 activates line 311A which activates the input to delay circuit 309. Hence, a certain specified time after the last digit has been gated from registers 10 and 11 to adder 12, delay circuit 309 activates line 343A. A signal on line 343A has the same effect as a signal on line 306A from detector 306 since both lines 343A and 306A form inputs to OR circuit 343. The signal on line 343A activates the input to AND circuit 328 thereby complementing flip-flop 304 and activating either OR circuits 346 or 347, thereby gating the last digit generated by adder 12 through carry adjust circuitry 16 to output 18. If the counter 15 has a value other than ZERO stored therein when the last two digits are summed and if the sum of the last two digits is NINE if an addition is being performed or if a subtraction is being performed, the output of delay circuit 309 activates line 327A which deactivates the output of OR circuit 339 and activates input 323A of AND circuit 323. A series of NINES or of ZEROS is therefore gated to the output register 18. Note, the delay introduced by delay circuit 309 must be such that in the above case line 323A is activated while line 323C is activated. The signal on line 309 also resets flip-flop 302 and 303 thereby preparing the circuitry for the next operation.

No circuitry is shown to handle the situation where the addition of the first two digits generates a sum greater than TEN. This is essentially an overflow condition which involves a shift in the decimal point plus the insertion of a ONE. Control circuitry to handle the overflow condition could be added but it is not essential to the invention.

*Subtraction.*—The sequence of operations which occur during a subtraction will now be explained with reference to the hardware shown in FIGURE 3. Before a substraction operation can begin, the numbers which are to be substracted are placed in registers 10 and 11. The system begins the subtraction under the assumption that the number in register 11 is smaller than the number in register 10. The manner in which the system detects if the initial assumption is incorrect and the manner in which it reverses its operation if the assumption is incorrect will be explained later. For present purposes, it will be assumed that the number placed in register 11 is smaller than the number placed in register 10. A "start Subtraction" pulse is applied to input 306 in order to start the subtraction. The pulse on input 306 through OR circuit 337 switched latch 301 to the left stable state which activates output 301A thereby conditioning gates 312 and 314 to transfer the first (i.e., the highest order) decimal digit from registers 10 and the first (i.e., the highest order) decimal digit in register 11 to adder 12.

The pulse on input 306 also switches latch 303 to the left stable state which activates output 303A thereby activating input 12A to adder 12. Since input 12A is activated, adder 12 complements the digits received on cable 12G from register 11 and adds the complemented digit to the digit received on cable 12H from register 10. The lower order digit of the sum generated by adder 12 is stored in either register 13 or register 14 except when the sum is a TEN. Detector 306 detects when adder 12 has completed generating a sum and when it detects that a sum has been generated it activates line 306A which after a delay introduced by circuit 310 activates one input to OR circuit 343 thereby activating the output of OR circuit 343. The output of OR circuit 343 activates one input to AND circuit 328. The second input to AND circuit 328 is activated through AND circuits 321, OR circuit 329 and inverter 351 and AND circuit 346 whenever the system is performing a subtraction and adder 12 generates a sum other than TEN. Hence, both inputs to AND circuit 328 are activated whenever a subtraction is being performed and adder circuit 12 generates a sum other than TEN. The output of AND circuit 328 activates the input to complementing flip-flop 304.

Complementing flip-flop 304 has two outputs 304A and 304B and an input 304C. Output 304A (1) through AND circuit 333 controls the operation of gate 316 which controls the transfer of the low order sum digit from adder 12 to register 13, and (2) through AND circuit 336 controls the operation of gate 319 which controls the transfer of information from register 14 to output register 18. Output 304B through AND circuit 335 controls the operation of gate 317 which controls the transfer of lower order sum digits from adder 12 to register 14 and (3) through AND circuit 334 controls the transfer of information from register 13 to output register 18.

As previously explained each time during a subtraction that adder 12 generates a sum other than TEN line 304C is activated thereby changing the state of flip-flop 304. Hence sums other than TEN generated by adder 12 are alternately stored in registers 13 and 14 and each time a digit is stored in either register 13 or 14 the digit stored in the other register 13 or 14 is gated through carry adjust circuitry 16 to output 18.

During a subtraction operation counter 15 is incremented each time adder 12 generates a sum digit of TEN. Each time adder 12 generates a sum of TEN it activates line 12D which activates one of the inputs to AND circuit 321. If a subtraction is being performed line 303A is activated by flip-flop 303 and the second input to AND circuit 321 is also activated. Hence, if adder 12 generates a sum of TEN while a subtraction is being performed the output of AND circuit 321 is activated thereby activating OR circuit 339 and input 15A of counter 15. Activation of input 15A of counter 15 increments counter 15 by one position.

During a subtraction operation counter 15 is decremented when it has a value other than ZERO stored therein and adder 12 generates a sum other than TEN. Since the output of OR circuit 339 is activated when adder 12 generates a TEN during a subtraction (as explained above) and since the output of OR circuit 339 activates the input of inverter 351, the output of inverter 351 will be active thereby activating line 323A whenever a subtraction is being performed and adder 12 generates a sum other than TEN. Line 323A forms one input of AND circuit 323. Line 323B which forms the second input of AND circuit 323 is activated (by a series of pulses) by counter 15 whenever the count in counter 15 is other than ZERO. The third input 323C of AND circuit 323 is activated by delay circuit 308 a slight time after the last digit is transferred through carry adjust circuitry 16 to output register 18. Hence, when adder 12 is performing a subtraction and a sum other than TEN is generated at a time when the count in counter 15 is greater than ZERO, a digit from one of the registers 13 or 14 is gated through carry adjust circuit 16 to output register 18 and after this digit passes detector 307, delay circuit 308 activates line 323C thereby activating the output of AND circuit 323 and activating input 16A of digit generator 16. In response to the pulses generated by counter 15 digit generator 16 thereby generates a number of ZEROS equal to the count in counter 15 and these ZEROS are gated to carry adjust circuitry 16.

As previously explained register 13 is reset through AND circuit 325 and OR circuit 342 each time that a digit is transferred from the register 13 through gate 318 to detector 307 and to output 18 and register 14 is reset through AND circuit 324 and OR circuit 341 each time a digit is transferred from register 14 through gate 319 through detector 307 to output register 18. Registers 13 and 14 can also be reset to ZERO by the output of AND circuit 326 through OR circuits 341 and 342. This occurs during a subtraction when the system finds that it has been complementing the incorrect number. (This procedure will be explained in detail later.)

During a subtraction operation when adder 12 generates a sum less than TEN and stores this digit in one of the registers 13 or 14 the digit stored in the other register 13 is gated through carry adjust circuitry 16 where it is decremented by ONE. When adder 12 generates a sum greater than TEN and places this sum in one of the registers 13 or 14 the digit in the other register 13 or 14 is gated unchanged through carry adjust circuitry 16. Hence, when adder circuit 12 generates a sum greater than TEN during a subtraction input 17B of carry adjust circuitry 17 must be activated and when during a subtraction operation adder circuit 12 generates a sum less than TEN input 17C of carry adjust circuitry 17 must be activated. During a subtraction operation input 17C of carry adjust circuitry 17 is activated by AND circuit 332 and input 17B of carry adjust circuitry 17 is activated through OR circuit 344 by the output of AND circuit 330. One input to AND circuit 330 and 331 is activated by the output 303A of flip-flop 303 which is active during a subtraction operation. The second input to AND circuit 332 is activated whenever a sum less than TEN is generated by adder 12 during a subtraction operation and the second input to AND circuit 330 is activated whenever a sum greater than TEN is generated by adder circuit 12. Hence, when a sum greater than TEN is generated the digit is transferred unchanged and when a sum less than TEN is generated the digit is decremented by ONE.

The operation of the other circuitry during subtraction is similar to the previously described operation of the circuitry during addition.

*Subtraction with numbers reversed.*—The operations which occur during a subtraction operation when the smaller number is placed in register 10 and the larger number is placed in register 11 will now be explained.

As previously explained when start subtraction input 306 is activated the output of OR circuit 337 sets flip-flop 301 to the left stable state thereby activating output 301A and thereby transferring the first digit from register 10 to adder input 12H and the first digits from register 11 to adder input 12G. Activation of input 306 also sets flip-flop 303 to the left stable state thereby activating output 303A which in turn activates input 12A of adder circuit 12. As previously explained, when line 12A is activated the added circuit 12 complements the digit received on line 12G and hence if the smaller number is in register 10 and the larger number is in register 11, the digits from register 10 must be gated to input 12G and the digits from register 11 must be gated to input 12H. In order to do this the state of flip-flop 301 must be changed so that output 301B is activated.

When start subtraction pulse is applied to input 306 the output from OR circuit 337 sets flip-flop 305 to the left stable state thereby deactivating output 305A. Flip-flop 305 is reset to the right stable state by the output of inverter 353 through AND circuit 320 the first time that adder circuit 12 generates a sum other than TEN. Adder circuit 12 activates output line 12D each time that it generates a sum of TEN and detector 306 activates one input of AND circuit 320 each time adder 12 generates a sum. Since the output of inverter 353 which is the second input to AND circuit 320 is activated whenever output line 12D is not activated, the output of AND circuit 320 is activated and flip-flop 305 is reset to the right stable state the first time that adder circuit 12 generates a sum other than TEN.

Output 305A of flip-flop 305 activates the input of single shot multivibrator 365. Hence, when flip-flop 305 changes from the left stable state to the right stable state a pulse is produced on output 365A. Output 365A is connected to one of the inputs of AND circuit 326. The output of AND circuit 326 is connected to input 301C of flip-flop 301. Input 301C of flip-flop 301 sets flip-flop 301 to the right stable state thereby deactivating line 301A and activating line 301B (which must be done in order to gate the digits from registers 10 and 11 to the correct input of adder circuit 12). In addition to the input from single shot multivibrator 365 AND circuit 326 has three other inputs respectively connected to lines 303A, 301A and 12E. The input connected to line 303A is activated whenever a subtraction is being performed, the input connected to line 301A is activated whenever flip-flop 301 is in the left stable state, and the last input connected to output 12E of adder circuit 12 is activated whenever adder circuit 12 produces a sum less than TEN.

If the first sum generated by adder circuit 12 when a subtraction is being performed is less than TEN, the output of inverter 353 is activated thereby changing flip-flop 305 to the right stable state and activating line 315A through single shot 315. Likewise if the sum is less than TEN output 12E of adder circuit 12 is activated. Since a subtraction is being performed lines 301A, and 303A are also activated and hence, the four inputs to AND circuit 326 are activated thereby activating the output line of AND circuit 326 and input 301C to flip-flop 301. When the input 301C to flip-flop 301 is activated flip-flop 301 is switched to the right stable state thereby activating output 301B and causing the digits from register 10 to be gated to adder circuit input 12G and the digits from register 11 to be gated to adder circuit input 12H (thereby causing the digits from register 10 to be complemented). The output of AND circuit 326 is also connected to the input of inverter 350. The output of inverter 350 is connected to one of the inputs to AND circuit 327. The output of AND circuit 327 activates line 227A which advances register access circuits 310 and 311. Hence, when the output of AND circuit 326 is activated it prevents AND circuit 327 from activating line 327A and hence it prevents the advance of register access circuits 310 and 311. For this reason the last digit gated to adder circuit 12 is regated to adder circuit 12 after the state of flip-flop 301 is changed.

If the sum generated when the first digit from adder circuit 12 is added to the complement of the first digit for adder circuit 11 is a TEN the system cannot determine whether the number in register 10 is larger than the number in register 11 or whether the number in register 11 is larger than the number in register 10. Hence, the second digit from register 10 is gated to input 12H of adder circuit 12 and the second digit from register 11 is gated to input 12G of adder circuit 12. Adder circuit 12 then adds the digit from register 10 to the complement of the digit from register 11 and the operation of the circuit described above occurs. That is, if the sum generated is less than TEN the state of flip-flop 305 and 301 are changed.

When the first sum generated by adder circuit 12 during a subtract operation is a TEN, counter 15 is incremented in the usual manner through AND circuit 321 and OR circuit 309. The reason for this is that if the first sum is a TEN, it indicates that the first digit of the result is a ZERO. The counter 15 is incremented for each TEN generated before the first sum other than TEN is generated.

The output of AND circuit 326 is also connected to one of the inputs of OR circuit 341 and 342. The first sum other than TEN generated by adder circuit 12 during a subtraction operation is placed in one of the registers 13 or 14 in the usual manner; however, when the output of AND circuit 326 is activated the registers 13 and 14 are reset to the empty condition through OR circuits 341 and 342 thereby destroying the incorrect digit which was placed in register 13 or 14.

When the larger number is placed in register 10 there is no need to change the state of flip-flop 301 after the subtraction begins. In such a case the first time that adder circuit 12 generates a sum digit other than TEN thereby activating the output of inverter circuit 353 and changing the flip-flop 305 to the right stable state, the sum generated by adder circuit 12 is greater than TEN and output 12E of adder circuit 12 is not activated. Hence, even though line 315A is activated when flip-flop 305 changes state the output of AND circuit 326 will not be activated since one of the inputs to AND circuit 326 is connected to line 12E, and the state of flip-flop 301 is not changed. Since the state of flip-flop 301 is not changed the digits from register 10 are continually gated to input 12H of adder circuit 12 and the digits from register 11 are continually gated to input 12G of adder circuit 12.

*Alternate embodiment*

The first embodiment of the invention shown herein performs subtraction by generating the TENS complement of the digits of the smaller of the two numbers which are being subtracted. An alternate embodiment of the invention generates the NINES complement of the digits of the smaller of the two numbers which are being subtracted. With a system which subtracts by generating NINES complements the counter 15 must be incremented each time adder 12 generates a sum of NINE irrespective of whether an addition or a subtraction is being performed.

A system which subtracts by generating the NINES complement of the digits of the smaller number operates exactly as the first embodiment of the invention operates during an addition until it arrives at the last digit of the result. As is well known in the art when subtraction is performed by generating NINES complements, there is an "end-around carry." In the second embodiment of the invention provision must be made so that when delay circuit 309 activates line 343A, input 17A of carry adjust circuitry 17 is also activated.

While the invention has been particularly shown and described with reference to preferred embodiments thereof, it will be understood by those skilled in the art that the foregoing and other changes in form and details may be made without departing from the spirit and scope of the invention.

What is claimed is:

1. In a device summing a multidigit augend and a multidigit addend,
adding means for generating the sum of two digits,
means for sequentially supplying to said adding means the digits of said augend, the highest order digit first,
means for supplying to said adding means the corresponding digit of the addend when each digit of the augend is supplied to said adding means,
a plurality of temporary storage registers,
means for storing the lowest order digit of sums other than NINE which are generated by said adding means in said temporary storage registers, sequentially generated sum digits other than NINE being stored in different temporary storage registers,
a counter,
means for incrementing said counter each time said adding means generates a sum of NINE,
output means,
means for transferring a digit without change from one of said temporary storage registers to said output means each time a sum less than NINE is stored in a different temporary storage register,
means for incrementing by ONE the digits stored in one of said temporary storage registers and for transferring the incremented digit to said output means each time the lower order digit of a sum greater than NINE is stored in a different temporary storage register,
means for generating and transferring to said output means one NINE digit for each count in said counter, when said adding means generates a sum less than NINE and said counter has a value other than ZERO stored therein,
means for generating and transferring to said output means one ZERO digit for each count in said counter, when said adding means generates a sum greater than NINE and said counter has a value other than ZERO stored therein,
whereby the sum of said multidigit augend and said multidigit addend is serially generated and transferred to said output means, the highest order digit first and the lowest order digit last.

2. A device for serially generating the sum of an augend and an addend,
first means for sequentially supplying to said device the digits of the addend, the highest order digit first,
second means for sequentially supplying to said device the corresponding digit of the augend each time a digit of the addend is supplied to said device,
means for temporarily storing the successive digits of said sum from said generating device, means for incrementing a digit in said temporary storage by ONE when an adjacent lower order sum is greater than NINE,
output storage means,
means for determining when no incrementing of a current digit as stored in said temporary storage means is necessary,
means responsive to said last named means, for serially transferring digits from said temporary storage means to said output storage means when incrementing of said current digit is not necessary.

3. In a device for subtraction a first multidigit number from a second multidigit number,
adding means for generating the sum of two digits,
means for sequentially supplying to said adding means the digits of said second number, the highest order digit first,
means for supplying to said adding means the TENS complement of the corresponding digit of said first number when each digit of said second number is supplied to said adding means,
a plurality of temporary storage registers,
means for storing the lowest order digit of sums other than TEN which are generated by said adding means in said temporary storage registers, sequentially generated sum digits being stored in different temporary storage registers,
a counter,
means for incrementing said counter each time said adding means generates a sum of TEN,
output means,
means for transferring a digit unchanged from one of said temporary storage registers to said output means each time the low order digit of a sum greater than TEN is stored in a temporary storage register,
means for decrementing by ONE the digit stored in one of said temporary storage registers and for transferring the decremented digit to said output means each time the lower order digit of a sum less than TEN is stored in a different temporary storage register,
means for generating and transferring to said output means one ZERO digit for each count in said counter when said adding means generates a sum greater than TEN and said counter has a value other than ZERO stored therein,
means for generating and transferring to said output means one NINE digit for each count in said counter when said adding means generates a sum digit less than TEN and said counter has a value other than ZERO stored therein,
whereby the difference between said first number and said second number is serially generated and transferred to said output means, the highest order digit first and the lowest order digit last.

4. In an arithmetic device
adding means for generating the sum of two digits,
a plurality of temporary storage registers,
means for storing the lowest order digit of sums other than NINE which are generated by said adding means in said temporary storage registers, sequentially generated sum digits other than NINE being stored in different temporary storage registers,
a counter,
means for incrementing said counter each time said adding means generates a sum of NINE, output means, means for transferring a digit without change from one of said temporary storage registers to said output means each time a sum less than NINE is stored in a different temporary storage register, means for incrementing by ONE the digits stored in one of said temporary storage registers and for transferring the incremented digit to said output means each time the lower order digit of a sum greater than NINE is stored in a different temporary storage register, means for generating and transferring to said output means one NINE digit for each count in said counter, when said adding means generates a sum less than NINE and said counter has a value other than ZERO stored therein, means for generating and transferring to said output means one ZERO digit for each count in said counter when said adding means generates a sum greater than NINE and said counter has a value other than ZERO stored therein.

5. In a device summing a multidigit augend and a multidigit addend, adding means for generating the sum of two digits, means for sequentially supplying to said adding means the digits of said augend, the highest order digit first, means for supplying to said adding means the corresponding digit of the addend when each digit of the augend is supplied to said adding means, a plurality of temporary storage registers, a counter output means, multipurpose means, for storing the lowest order digit of sums other than NINE which are generated by said adding means in said temporary storage registers, sequentially generated sum digits other than NINE being stored in different tomporary storage registers, for incrementing said counter each time said adding means generates a sum of NINE, for transferring a digit without change from one of said temporary storage registers to said output means each time a sum less than NINE is stored in a different temporary storage register, for incrementing by ONE the digits stored in one of said temporary storage registers and for transferring the incremented digit to said output means each time the lower order digit of a sum greater than NINE is stored in a different temporary storage register, for generating and transferring to said output means one NINE digit for each count in said counter, when said adding means generates a sum less than NINE and said counter has a value other than ZERO stored therein, and for generating and transferring to said output means one ZERO digit for each count in said counter when said adding means generates a sum greater than NINE and said counter has a value other than ZERO stored therein, whereby the sum of said multidigit augend and said multidigit addend is serially generated and transferred to said output means, the highest order digit first and the lowest order digit last.

6. In a device for generating a number which represents the difference between a larger number and a smaller number, a first register and a second register, said numbers being stored in said registers, adding means for generating the sum of two digits, multipurpose means:

for sequentially supplying to said adding means the digits stored in said first register, the highest order digit first, and for supplying to said adding means the TENS complement of the corresponding digit of the number stored in said second register when each digit of the number stored in said first register is supplied to said adding means until the first sum other than TEN is generated by said adding means, for sequentially supplying to said adding means the digits stored in said first register and not previously supplied to said adding means, the highest order digit first, and for supplying to said adding means the TENS complement of the corresponding digit of the number stored in said second register when each digit of the number stored in said first register is supplied to said adding means when the first sum other than TEN generated by said adding means is less than TEN, and for sequentially supplying to said adding means the TENS complement of the digits stored in said first register, beginning with the TENS complement of the digit last supplied to said adding means and proceeding to the lower order digits, and for supplying to said adding means the corresponding digit of the number stored in said first register when each digit of the number stored in said second number is supplied to said adding means, multipurpose means:

for storing the lowest order digit of sums other than TEN which are generated by said adding means in temporary storage registers, sequentially generated sum digits other than TEN being stored in different temporary storage registers, for incrementing a counter each time said adding means generates a sum of TEN, for transferring a digit without change from one of said temporary storage registers to said output means each time a sum greater than TEN is stored in a different temporary storage register, for decrementing by ONE the digits stored in one of said temporary storage registers and for transferring the decremented digit to said output means each time the lower order digit of a sum less than TEN is stored in a different temporary storage register, for generating and transferring to said output means one NINE digit for each count in said counter, when said adidng means generates a sum less than TEN and said counter has a value other than ZERO stored therein, and for generating and transferring to said output means one ZERO digit for each count in said counter when said adding means generates a sum greater than TEN and said counter has a value other than ZERO stored therein, whereby the number which represents the differences between the larger number and the smaller number is sequentially transferring to said output means, the highest order digit first.

7. In an arithmetic device, adding means for generating the sum of two digits, first and second temporary storage registers, means for storing the lowest order digit of sums other than NINE which are generated by said adding means in said temporary storage registers, sequentially generated sum digits other than NINE being stored in alternate temporary storage registers, a counter, means for incrementing said counter each time said adding means generates a sum of NINE, output means, multipurpose means:

for transferring a digit without change from said first temporary storage register to said output means each time a sum less than NINE is stored in said second temporary storage register and for transferring a digit without change from said second temporary storage register to said output means each time a sum less than NINE is stored in said first temporary storage register, for incrementing by ONE the digit stored in said second temporary storage register and for transferring the incremented digit to said output means each time the lower order digit of a sum greater than NINE is stored in said first temporary storage register, and for incrementing by ONE the digit stored in said first temporary storage register and for transferring the incremented digit to said output means each time the lower order digit of a sum greater than NINE is stored in said second temporary storage register, for generating and transferring to said output means one NINE digit for each count in said counter, when said adding means generates a sum less than NINE and said counter has a value other than ZERO stored therein, and for generating and transferring to said output means one ZERO digit for each count in said counter when said adding means generates a sum greater than NINE and said counter has a value other than ZERO stored therein.

8. In a device for generating the sum of a first number and a second number, adding means for generating the sum of two digits, means for sequentially supplying to said adding means the digits of said first number beginning with the highest order digit and ending with the lowest order digit, means for supplying to said adding means the corresponding digit of the second number when each digit of the first number is supplied to said adding means, a plurality of temporary storage registers, means for storing the lowest order digit of sums other than NINE which are generated by said adding means in said temporary storage registers, sequentially generated sum digits other than NINE being stored in different temporary storage registers, a counter, means for incrementing said counter each time said adding means generates a sum of NINE, output means, carry adjust means for incrementing a digit by ONE, means for transferring a digit without change from one of said temporary storage registers to said output means each time a sum less than NINE is stored in a different temporary storage register, means for transferring a digit through said carry adjust means where it is incremented by ONE and for transferring the incremented digit to said output means each time the lower order digit of a sum greater than NINE is stored in a different temporary storage register, digit generating means for generating one NINE digit for each count in said counter when said adding means generates a sum other than NINE and said counter has a value other than ZERO stored therein, means for transferring the digits generated by said digit generating means unchanged to said output means when said adder circuit generates a sum less than NINE and said adder circuit has a count other than ZERO stored therein and for transferring the digits generated by said digit generating means through said carry adjust means where the digits are changed to ZEROS and then to said output means when said adding means generates a sum greater than NINE and said adder circuit has a count other than ZERO stored therein, whereby the sum of said multidigit augend and said multidigit addend is serially generated and transferred to said output means, the highest order digit first and the lowest order digit last.

References Cited by the Examiner

UNITED STATES PATENTS

| | | | |
|---|---|---|---|
| 2,538,636 | 1/1951 | Williams | 235—159 |
| 2,923,475 | 2/1960 | Ketchledge | 235—175 |
| 3,133,190 | 5/1964 | J. P. Eckert et al. | 235—177 |

ROBERT C. BAILEY, *Primary Examiner.*

MALCOLM A. MORRISON, *Examiner.*

M. P. ALLEN, I. S. KAVRUKOV, *Assistant Examiners.*